United States Patent [19]

Oneda

[11] Patent Number: 5,953,705
[45] Date of Patent: Sep. 14, 1999

[54] TICKETLESS SYSTEM AND PROCESSING METHOD AND MEMORY MEDIUM STORING ITS PROCESSING PROGRAM

[75] Inventor: Hideo Oneda, Kawasaki, Japan

[73] Assignee: Fujitsu Limited, Kawasaki, Japan

[21] Appl. No.: 08/804,516

[22] Filed: Feb. 21, 1997

[30] Foreign Application Priority Data

Sep. 13, 1996 [JP] Japan ................................. 8-242752

[51] Int. Cl.⁶ ............................. G07B 1/00; G06F 17/60
[52] U.S. Cl. .................................. 705/5; 705/13
[58] Field of Search ............................. 705/5, 13

[56] References Cited

U.S. PATENT DOCUMENTS

| | | | |
|---|---|---|---|
| 4,365,324 | 12/1982 | Michaelis | 369/44 |
| 4,449,186 | 5/1984 | Kelly et al. | 705/5 |
| 4,740,939 | 4/1988 | Kimura et al. | 369/32 |
| 4,775,966 | 10/1988 | Miura et al. | 369/44 |
| 5,046,058 | 9/1991 | Shimonou | 369/32 |
| 5,065,383 | 11/1991 | Tateishi et al. | 369/44.28 |
| 5,408,417 | 4/1995 | Wilder | 705/5 |
| 5,428,590 | 6/1995 | Ogino | 369/44.28 |
| 5,504,321 | 4/1996 | Sheldon | 235/492 |
| 5,521,966 | 5/1996 | Friedes et al. | 379/91.02 |
| 5,559,885 | 9/1996 | Drexler et al. | 380/23 |
| 5,724,520 | 3/1998 | Goheen | 705/5 |
| 5,732,398 | 3/1998 | Tagawa | 705/5 |

FOREIGN PATENT DOCUMENTS

| | | | |
|---|---|---|---|
| 0 372 650 | 6/1990 | European Pat. Off. | G11B 7/09 |
| 0 422 851 | 4/1991 | European Pat. Off. | G11B 7/085 |
| 0421808 A2 | 4/1991 | European Pat. Off. | G07F 7/10 |
| 0518808 A2 | 5/1992 | European Pat. Off. | G07F 7/08 |
| 0708424 A1 | 4/1996 | European Pat. Off. | G07F 19/00 |
| 2136990 | 11/1988 | Japan | G07B 11/02 |
| 2000350 | 1/1979 | United Kingdom | G07B 1/00 |
| 2000621 | 1/1979 | United Kingdom | G07B 1/00 |
| WO 91/16691 A1 | 10/1991 | WIPO | G07F 7/10 |
| WO 96/36025 A2 | 11/1996 | WIPO | G07F 7/08 |
| WO 97/02548 A1 | 1/1997 | WIPO | G07F 7/10 |

OTHER PUBLICATIONS

Patent Abstracts of Japan, vol. 014, No. 465 (P–1114), Oct. 9, 1990 & JP 02 185720 A (Matsushita Electric Ind Co Ltd), Jul. 20, 1990 *abstract*.

Patent Abstracts of Japan, vol. 009, No. 182 (P–376), Jul. 27, 1985 & JP 60 052935 A (Toshiba KK), Mar. 26, 1985 *abstract*.

Patent Abstracts of Japan, vol. 015, No. 460 (P–1278), Nov. 21, 1991 & JP 03 194732 A (Oki Electric Ind Co Ltd), Aug. 26, 1991 *abstract*.

*Primary Examiner*—Allen R. MacDonald
*Assistant Examiner*—James W. Myhre
*Attorney, Agent, or Firm*—Staas & Halsey, LLP

[57] ABSTRACT

A ticketless system for processing information for issuance of an airplane ticket or the like by using an IC card. The ticketless system includes a coupon ticket issuing module for recording coupon ticket issue information onto a distribution source card to enable plural use of the distribution source card. A coupon ticket moving module records coupon ticket movement information which moves a part of the coupon ticket of the distribution source card to a distribution destination card and enables the coupon ticket movement information to be used with the distribution destination card. A use processing module processes a use such as a reservation, a ticket issuance, a check-in, or a boarding by using the distribution source card or distribution destination card. In addition, a temporary card issuing module issues a temporary card in which a name of the user is not registered on the ticketless system and which is temporarily used. When the tempory card is employed, the coupon ticket moving module records coupon ticket movement information which moves a part of the coupon ticket of the distribution source card to the temporary card and enables the moved part of the coupon ticket to be used by the temporary card.

22 Claims, 30 Drawing Sheets

| USE YEAR /MONTH /DAY 92 | USER 94 | THE NUMBER OF USING TIMES 96 | DISCOUNT KIND 98 | THE NUMBER OF REMAINING USING TIMES 100 |
|---|---|---|---|---|
| 1996.02.20 | A | 1 | | 9 |
| 1996.03.01 | C | 1 | | 8 |
| 1996.04.15 | A | 0.65 | EARLY MORNING | 7.35 |
| 1996.05.05 | B | 0.75 | SENIOR | 6.6 |

75 — ID

58 — CAREER INFORMATION FILE

| 162 | 164 | 166 | 168 |
|---|---|---|---|
| INTERVAL | CLASS | THE NUMBER OF SERIAL COUPON TICKETS | THE NUMBER OF USING TIMES |
| TOKYO-OSAKA | BUSINESS | 10 | 1 |

| 170 | 172 | 174 | 176 |
|---|---|---|---|
| THE NUMBER OF TIMES OF DISTRIBUTION | THE NUMBER OF REMAINING USING TIMES | INDIVIDUAL INFORMATION | ATTRIBUTE |
| 5 | 4 | | REGISTRATION |

| 178 | 179 | 180 | 182 |
|---|---|---|---|
| PURCHASE YEAR/ MONTH/DAY | TERM OF VALIDITY | ISSUING LOCATION | ISSUING ENTERPRISE |
| 1996.01.20 | 1996.04.20 | TOKYO | X Co. |

TICKETLESS SYSTEM AND PROCESSING METHOD AND MEMORY MEDIUM STORING ITS PROCESSING PROGRAM

BACKGROUND OF THE INVENTION

The invention relates to ticketless system and processing method for recording a boarding coupon ticket of an airline or the like to an IC card and for performing a reservation, a ticket issuing, a check-in, a boarding, and the like and also relates to a memory medium in which a processing program for the ticketless system has been stored. More particularly, the invention relates to ticketless system and processing method whereby a coupon ticket purchased among cards is distributed so as to enable a plurality of persons to use it and also relates to a memory medium in which a processing program for the ticketless system has been stored.

In recent years, an IC card standardized by a bank and terminal devices such as ATM, DC, window device, and the like at which money can be drawn out by the IC card are rapidly being put into practical use. In order to enable the IC card to be used and to raise an additional value, the IC card issued by the bank has an enough lending region in addition to a region for a bank use according to a bank standard format. Consequently, by utilizing the lending region of the IC card and by using a computer network and terminal devices of an on-line host system of the bank regarding the IC card, a ticketless process in a system of, for example, an airline, a train, a ship, or the like can be realized. In this case, in a service offering enterprise such as airline company, travel agency, ticket company, or the like, since a POS system for selling a ticket by subscription has already been constructed, a ticketless system to reserve by using the IC card can be relatively easily constructed by providing a function as a reader/writer of the IC card for a terminal of the POS system. In a traffic system for performing a passenger transportation, a coupon ticket in which a use interval and the number of using times have been predetermined is issued to serve a convenience of a customer who often uses the system, so that the user can get a discount service of a fare by purchasing the coupon ticket.

However, in the ticketless system of the airline ticket using the IC card, when the coupon ticket is purchased by the IC card and is used by a plurality of persons, since the coupon ticket is issued on the assumption that the holder himself of a title (hereinafter, the holder of a title is simply referred to as a "holder") who purchased the coupon ticket uses it, there is an inconvenience that the coupon ticket purchased by the IC card as a medium can be used by only the holder himself. This is because, inherently, the coupon ticket of the airline is issued on the assumption that the same person uses the ticket a plurality of number of times in a form such that ten serial boarding tickets with a cover on which the name of the user himself is shown are issued, and that when using the coupon ticket, the user has an obligation to show the cover indicating the holder. Therefore, when the coupon ticket which has been issued as a ticket is issued as it is by using the IC card as a medium, the holder of the IC card is the holder of the name shown on the cover of the coupon ticket, and since the user is obliged to show the name of the holder, there is a problem such that the coupon ticket of the IC card can be used by only the holder himself. Generally, however, the coupon ticket is effectively used by an enterprise or the like which often uses the ticket. There are many cases where the coupon ticket is purchased by using a name of, for example, a specific person of the enterprise and when actually using, the coupon ticket is distributed to users in the enterprise and boarding tickets are reserved and purchased. Therefore, the ticketless coupon ticket by the IC card cannot be distributed to other persons, an efficient use of the coupon ticket using the IC card cannot be expected, and it is apprehended that the above facts become obstacles when the ticketless system is operated.

SUMMARY OF THE INVENTION

According to the invention, there are provided ticketless system and processing method whereby a coupon ticket of an airline or the like issued by an IC card as a medium can be used by a plurality of persons and a memory medium in which a processing program for the ticketless system has been stored.

The invention relates to a ticketless system in which a passenger traffic facility such as an airline or the like is used by using information stored in a card in which a processor and a memory are installed, namely, what is called an IC card. The ticketless system has: a coupon ticket issuing module for recording coupon ticket issue information for enabling a distribution source card serving as a distribution source of the coupon ticket to be used a plurality of number of times onto such a card; a coupon ticket moving module for recording coupon ticket movement information for moving (a part or all of) the coupon ticket of the distribution source card to a distribution destination card and enabling the ticket to be used; and a use processing module for processing uses such as reservation, ticket issue, check-in, boarding, and the like on the basis of the coupon ticket issue information of the distribution source card or coupon ticket movement information of the distribution destination card. Consequently, the coupon ticket can be purchased by the IC card and can be moved to a card owned by another person and is used as necessary, and the issue and use of the coupon ticket using the card can be realized in the ticketless system. Each of the distribution source card in which the coupon ticket issue information has been stored and the distribution destination card in which the coupon ticket movement information has been stored is a registration card which has previously been registered in the system by the personal name of the user.

A temporary card issuing module for issuing a temporary card in which the name of the user is not registered in the system and which is temporarily used is further provided. As coupon ticket issue information of the distribution source card, ID information of the card holder corresponding to a cover of the coupon ticket, a use range such as an interval or the like, the number of serial coupon tickets, the number of using times, the number of times of distribution, the number of remaining using times, personal information such as an age or the like, a card attribute (card kind), purchase year/month/day, a purchase location, and the like are recorded. As coupon ticket movement information of the distribution destination card, holder ID information of the distribution source card corresponding to the cover of the coupon ticket, a use range such as an interval or the like, the number of times of distribution, the number of using times, the number of remaining using times, individual information such as an age or the like, a card attribute, purchase year/month/day, a purchase location, and the like are recorded. Further, as coupon ticket movement information of the temporary card, the holder ID information of the distribution source card corresponding to the cover of the coupon ticket, a use range such as an interval or the like, the number of times of distribution, the number of using times, the number of remaining using times, individual information such as an age or the like, a card attribute, purchase year/month/day, a purchase location, and the like are recorded.

Further, the ticketless system of the invention has: a purchase information file for recording an issuing situation of the coupon ticket and managing; a career information file for recording a use situation of the coupon ticket which has already been issued and managing; a customer information file for recording individual information regarding the user of the coupon ticket which has already been issued and managing; and a discount rate information file for recording a discount rate to be used for conversion of the number of using times and managing. The purchase information file records and manages a processing division such as purchase of the coupon ticket, movement, or temporary use, use contents such as an interval and the like, a class, the number of serial coupon tickets, the number of moving times, a movement destination, processing year/month/day, a term of validity, settlement information, the number of issuing temporary cards, and the like. The career information file records and manages use year/month/day, the name of the user, the number of using times, and the number of remaining using times. The customer information file records and manages a customer ID, the name of the user, an address, concerned customer information, a customer kind, and a card kind. Further, the discount rate information file records and manages a discount rate which has been predetermined in accordance with an age, a time zone, or the like. When the use such as reservation, ticket issue, check-in, boarding, or the like based on the distribution source card, distribution destination card, or temporary card is processed, the use processing module provides a predetermined service such as a mileage or the like to the holder of the distribution source card with reference to the customer information file. When the user is the holder of the distribution destination card which received the distribution of the coupon ticket, the use processing module forms information indicative of a new customer and notifies the service providing side of a fact that he is the new customer at the time of the use such as check-in at an airport counter, boarding, or the like. That is, in many cases, the card holder serving as a distribution source of the coupon ticket is an excellent customer. A possibility such that the user of the distribution destination card which received the distribution of the coupon ticket from the excellent customer is also inevitably an excellent customer is high. A gate staff, a steward, and the like make a greeting or the like to the customer who was notified as a new customer and who used the distribution destination card, thereby enabling the getting of the new excellent customer to be efficiently realized. The use processing module obtains a corresponding discount rate with reference to the discount rate information file upon reservation, calculates the number of using times from the discount rate, and updates the number of remaining using times of the career information file. As discount kinds, there are a discount for a child, a discount for a senior, a discount for the use in the early morning, and the like, so that it is possible to further complete the services issued for the card as a target.

The use processing module confirms the presence or absence of the issue of a formal registration card registered in the system to the user of the temporary card when performing the process such as reservation, ticket issue, or the like by the temporary card and, when receiving an issuing request, issues a formal distribution destination card in which the coupon ticket movement information of the temporary card has been recorded. A possibility such that the user of the temporary card which received the distribution of the coupon ticket from the excellent customer as a distribution source of the coupon ticket is also an excellent customer is high. By offering the use of the coupon ticket by the issue of the formal card at the time of the reservation or check-in, it can be efficiently realized to newly acquire an excellent customer. The use processing module can also issue a magnetic card or a ticket as a ticket which can be used only once as necessary for the reservation by using the distribution source card, distribution destination card, or temporary card. Therefore, a function of the existing ticket system is not damaged.

The coupon ticket moving module is provided for a portable terminal apparatus of the user and a part of the coupon ticket is moved from the distribution source card to the distribution destination card on the user side, so that the use by the distribution of the coupon ticket can be performed in a manner similar to the case where the coupon ticket is purchased by the ticket. The coupon ticket issuing module, coupon ticket moving module, and temporary card issuing module are provided for the counter terminal apparatus or automatic ticket issuing machine of the system, thereby executing the issue of the coupon ticket for the distribution source card, the movement of a part of the coupon ticket from the distribution source card to the distribution destination card, and further, the issue of the temporary card to which a part of the coupon ticket was moved from the distribution source card. The coupon ticket which is handled in the ticketless system of the invention is a boarding coupon ticket of an airline. In addition to this ticket, however, coupon tickets to use proper means of transportation or facilities are also incorporated.

According to the invention, there is provided a ticketless processing method of reserving the use of a passenger traffic facility such as an airline or the like by using information stored in a card in which a processor and a memory are installed. The ticketless processing method comprises the following steps:

a coupon ticket issuing step of recording coupon ticket issue information for enabling the use of a plurality of number of times to a distribution source card serving as a distribution source of the coupon ticket;

a coupon ticket moving step of recording coupon ticket movement information for moving the coupon ticket of the distribution source card to another distribution destination card, thereby enabling the ticket to be used; and a use processing step of processing the use such as reservation, ticket issue, check-in, boarding, or the like on the basis of the coupon ticket issue information of the distribution source card or the coupon ticket movement information of the distribution destination card.

As each of the card in which the coupon ticket issue information is stored and the card in which the coupon ticket movement information is stored, a registration card which has previously been registered in the system by a personal name of the user is used. Further, a temporary card issuing step of issuing a temporary card in which the user name is not registered in the system and which is temporarily used is provided. In this case, in the coupon ticket moving step, the coupon ticket movement information for moving the coupon ticket of the distribution source card to the temporary card, thereby enabling the ticket to be used is recorded.

Further, according to the invention, there is provided a memory medium in which a processing program of the ticketless system to use a passenger traffic facility such as an airline or the like by using information stored in a card in which a processor and a memory are installed, what is called an IC card has been stored. The processing program in the memory medium has: a coupon ticket issuing module for recording coupon ticket issue information for enabling the use of a plurality of number of times to the distribution source card serving as a distribution source of the coupon ticket; a coupon ticket moving module for recording coupon ticket movement information for moving (a part or all of) the coupon ticket of the distribution source card to the distribution destination card, thereby enabling the ticket to be used; and a use processing module for processing the use such as reservation, ticket issue, check-in, boarding, or the like based on the basis of the coupon ticket issue information of the distribution source card or the coupon ticket movement information of the distribution destination card. Each of the distribution source card in which the coupon ticket issue information is stored and the distribution destination card in which the coupon ticket movement information is stored is a registration card which has previously been registered in the system by a personal name of the user. The processing program of the memory medium further has a temporary card issuing module for issuing a temporary card in which the name of the user is not registered in the system and which is temporarily used. As a memory medium, a proper memory medium such as optical disk, floppy disk, magnetic tape, semiconductor memory, or the like can be used.

The above and other objects, features, and advantages of the present invention will become more apparent from the following detailed description with reference to the drawings.

DETAILED DESCRIPTION OF THE PREFERRED EMBODIMENT

Figure 1:
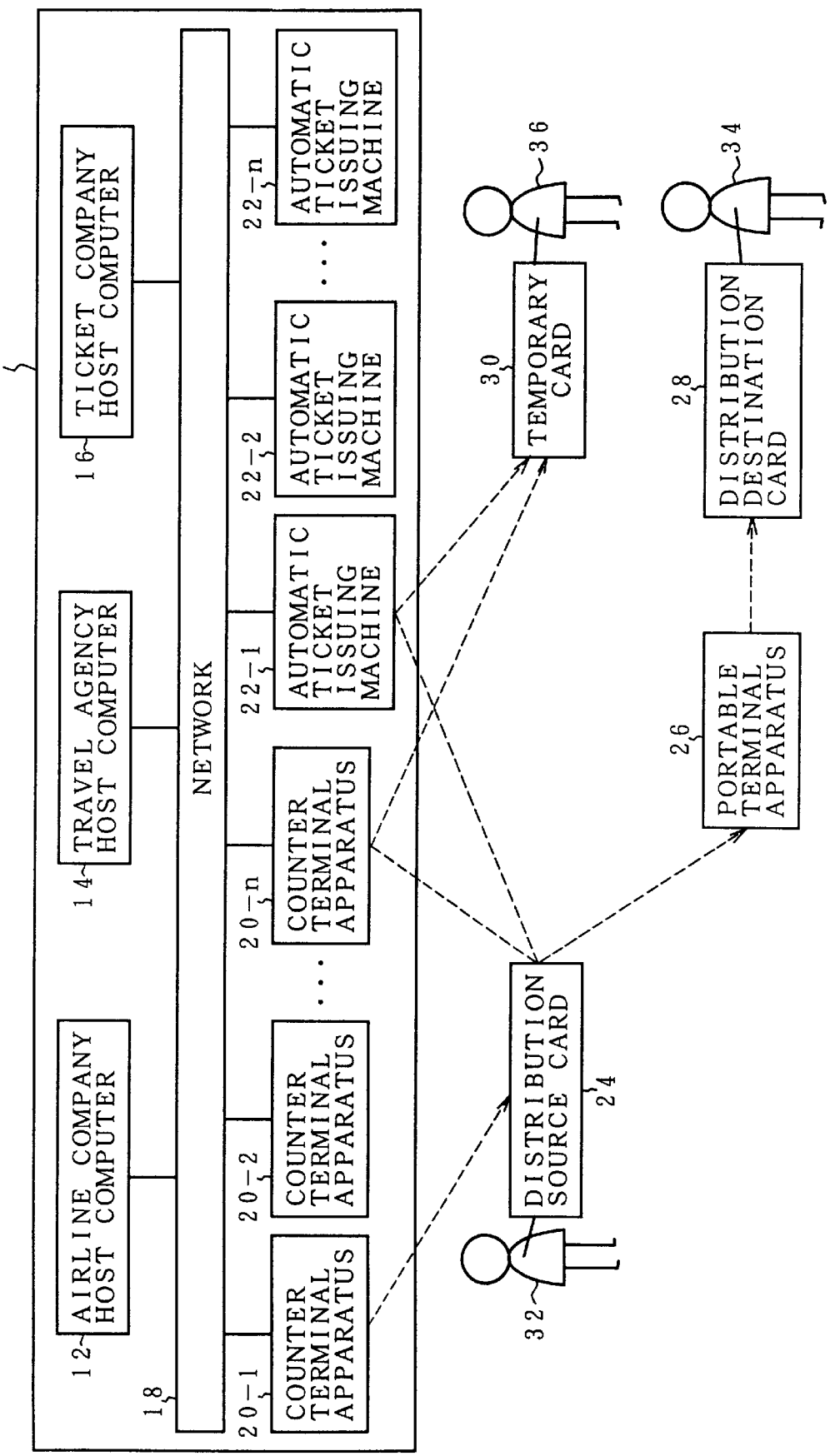
FIG. 1 is a block diagram of a system environment of the invention.

FIG. 1 shows a system construction of a ticketless system according to the invention and relates to an example of a reservation system of a boarding ticket of an airplane. A reservation system 10 has an airline company host computer 12, a travel agency host computer 14, and further, a ticket company host computer 16. Those computers are connected by a network 18. Counter terminal apparatuses 20-1 to 20-n and automatic ticket issuing machines 22-1 to 22-n which are used in the airline company, travel agency, and ticket company are connected to the network 18. The counter terminal apparatuses 20-1 to 20-n are used for counter works such as reservation and ticket issue of a coupon ticket, check-in, and the like. The automatic ticket issuing machines 22-1 to 22-n are used for an automation of the check-in at an airport counter or a boarding gate in addition to the reservation and ticket issue. A providing side of the system comprising the airline company, travel agency, and ticket company which construct the reservation system 10 receives a request from the user and issues an IC card to be used for a ticketless reservation. The IC card that is issued by a service providing enterprise is used as a ticketless card of an airline coupon ticket which is issued by the airline company. Specifically speaking, a user 32 visits the airline company, travel agency, or ticket company constructing the reservation system 10 and makes an application to register the IC card, so that an IC card which can be used as an airline coupon ticket by using the counter terminal apparatuses 20-1 to 20-n is issued to the user 32. The IC card is issued simultaneously with the application to purchase the airline coupon ticket for the airline company by the user 32. Use information as an airline coupon ticket is recorded on a distribution source card 24 which is issued to the user 32. The user 32 who received an offer of the distribution source card 24 as an airline coupon ticket sets the distribution source card 24 into the counter terminal apparatuses 20-1 to 20-n or automatic ticket issuing machines 22-1 to 22-n, so that all processes such as boarding reservation, ticket issue, check-in at the airport, and passage at the boarding gate according to a use range of the coupon ticket, namely, an interval, the number of serial tickets, a seat class, and the like can be executed in a ticketless manner. According to the system of the invention, further, the user 32 who received the offer of the distribution source card 24 in which the use information of the airplane coupon ticket has been stored can move a part or all of the coupon tickets of the distribution source card 24 to another IC card registered in the reservation system 10, namely, a distribution destination card 28 owned by another user 34. The movement of the part of the airline coupon tickets of the distribution source card 24 to the distribution destination card 28 can be performed by using an application module as coupon ticket moving software installed in a portable terminal apparatus 26 owned by the user in addition to the counter terminal apparatuses 20-1 to 20-n and automatic ticket issuing machines 22-1 to 22-n provided for the reservation system 10. The distribution source card 24 held by the user 32 who purchased the airline coupon ticket first and the distribution destination card 28 to which the airline coupon ticket of the distribution source card 24 was moved are registration cards which have previously been registered in the reservation system 10. As another means, the airline coupon ticket of the distribution source card 24 can be also moved to a temporary card 30 which is temporarily issued to a user 36 by the reservation system 10. Since the temporary card 30 and the coupon ticket need to be simultaneously issued, the movement of the airline coupon ticket to the temporary card 30 is performed by using the counter terminal apparatuses 20-1 to 20-n provided for the reservation system 10. As distribution source card 24, distribution destination card 28, and further, temporary card 30 which are used as airline coupon tickets in the reservation system 10 of the invention, for example, IC cards standardized by the bank are used.

Figure 2A:
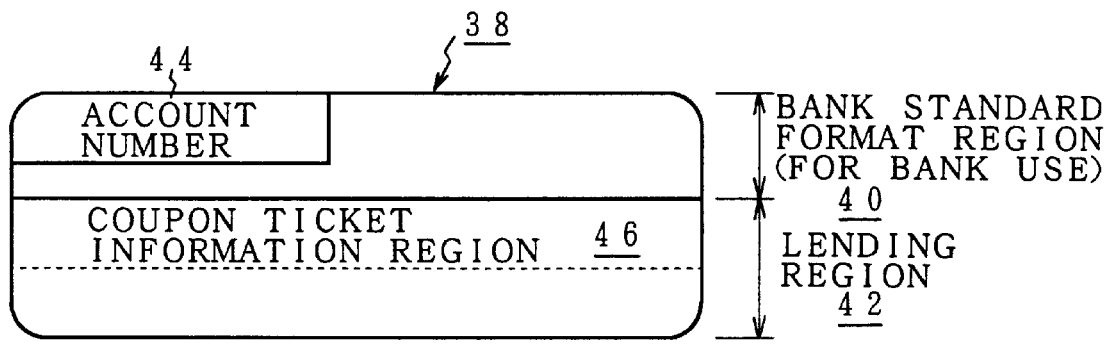
FIGS. 2A to 2C are explanatory diagrams of IC cards which are used in the invention.

FIG. 2A shows an IC card which is used in the system of the invention. An IC card 38 is a card medium for an information process and an information storage standardized by the bank and at least a processor and a memory are built therein. By setting the IC card 38 into an ATM, a CD, or the like which serves as an input/output terminal and is provided for a bank computer system, the IC card receives a power supply by a connection between a terminal provided for the card itself and a terminal unit, simultaneously couples a transmission path, and can execute an ordinary bank transaction such as payment, withdrawal, deposit, transfer, or the like. As for a memory region, the IC card 38 has not only a bank standard format region 40 for a bank use but also a lending region 42 which can be used by the third person. At least an account number 44 has been recorded in the bank standard format region 40 and the other contents are based on a predetermined bank standard format. In the ticketless system of the invention, a coupon ticket information region 46 is allocated to the lending region 42 of the IC card 38 and is used. As information in the bank standard format region 40 which is necessary to use the coupon ticket information region 46, it is sufficient to have the account number 44. Therefore, the account number 44 of the IC card 38 can be also used as a holder ID indicative of the name of the card owner in the system.

Figure 2B:
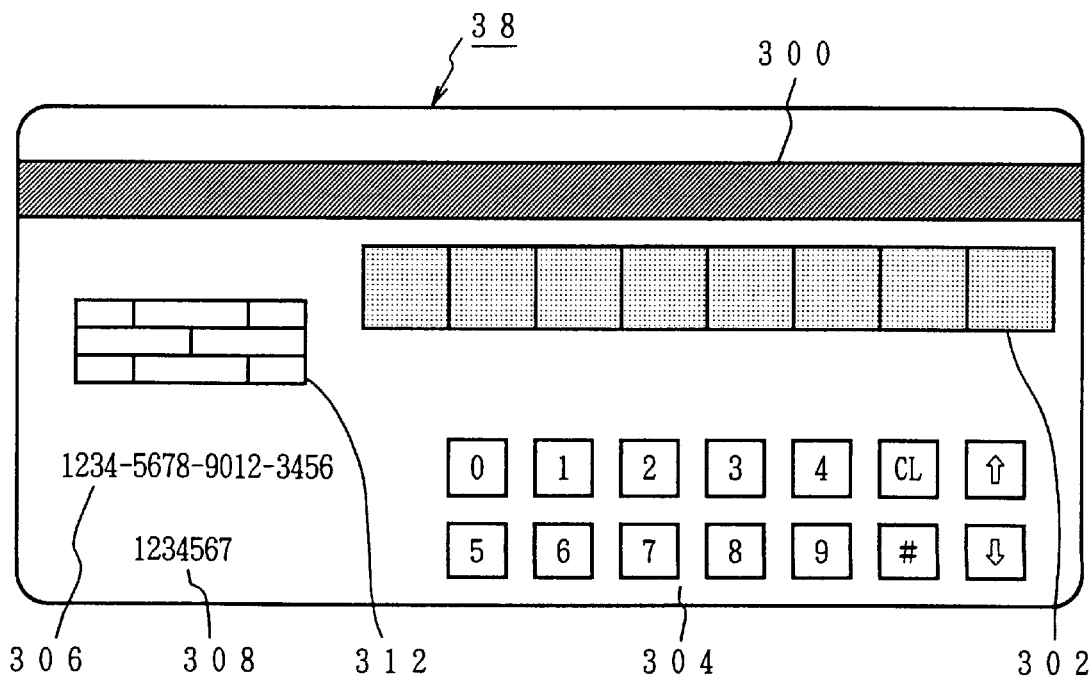

FIG. 2B shows a specific example of the IC card 38 which is used in the invention, namely, the IC card 38 with a display. The IC card 38 has: a magnetic stripe portion 300 of, for example, the JIS-II type which is used when a credit or the like is used; a display portion 302 in which the coupon ticket information can be switchingly displayed; a ten-key portion 304 for inputting a personal identification code to confirm the person himself; an account number portion 306; a customer number portion 308 corresponding to seven digits; and an ID card portion 312. Further, a name (signature), a photograph, and the like of the owner are provided on the rear surface of the card in correspondence to, for example, JIS-I.

Figure 2C:
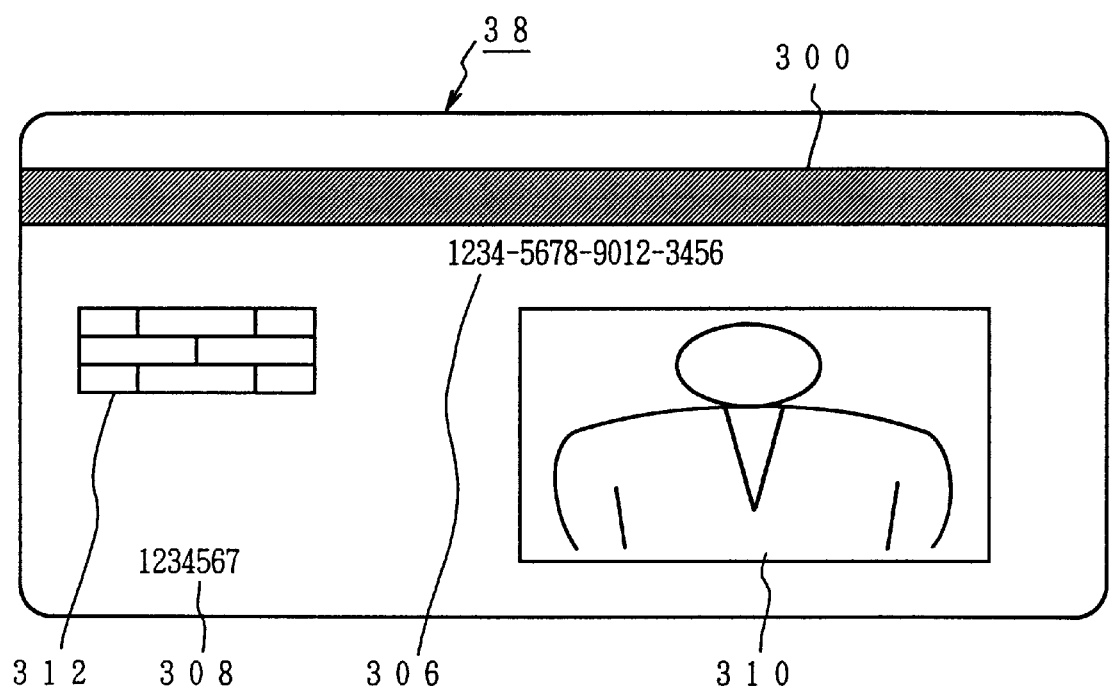

FIG. 2C shows another specific example of the IC card 38 which is used in the invention. As compared with FIG. 2B, the IC card 38 with no display is used. The IC card 38 has the magnetic stripe portion 300, ten-key portion 304, account number portion 306, customer number portion 308, a photograph portion 310, and IC card portion 312. The name (signature) of the owner is provided on the rear surface of the card in correspondence to, for example, JIS-I.

Figure 3:
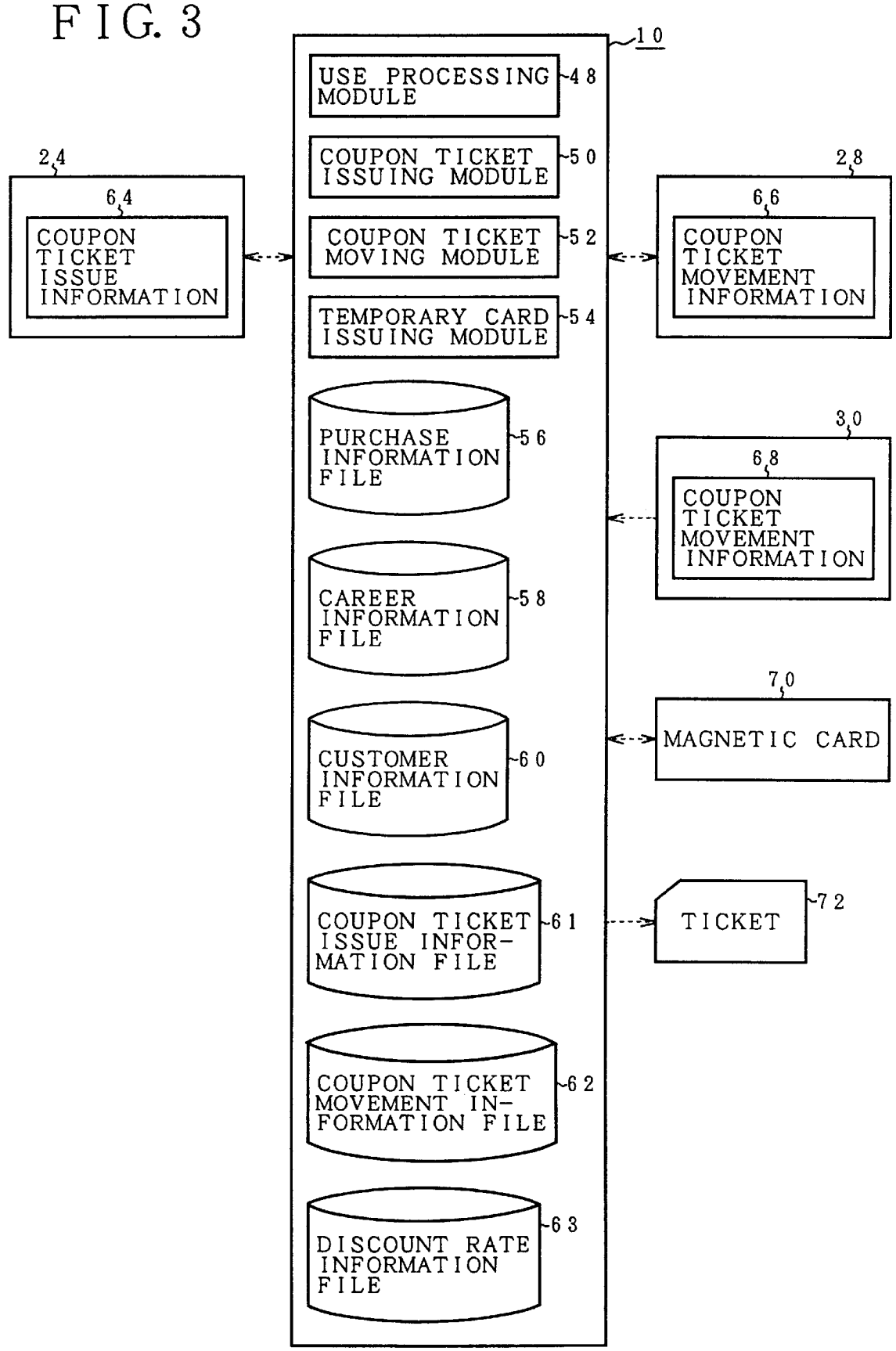
FIG. 3 is a block diagram of system functions of the invention.

FIG. 3 is a functional block diagram of the ticketless system of the invention. In the reservation system 10, as program modules for providing a ticketless service of the airline coupon ticket using the IC card, a use processing module 48, a coupon ticket issuing module 50, a coupon ticket moving module 52, and a temporary card issuing module 54 are prepared. For the purpose of an information management of a ticketless reservation service of the coupon ticket using the IC card, a purchase information file 56, a career information file 58, a customer information file 60, a coupon ticket issue information file 61, a coupon ticket movement information file 62, and further, a discount rate information file 63 are provided as a database for the reservation system 10. The coupon ticket issuing module 50 of the reservation system 10 receives an application to purchase the coupon ticket from the user and records coupon ticket issue information 64 onto the distribution source card 24 as a registration card owned by the application user. Thus, the user can purchase the airline coupon ticket from the reservation system 10. By using the coupon ticket issue information 64 of the distribution source card 24 recorded by the purchase of the airline coupon ticket, all of the boarding ticket reservation using the coupon ticket, ticket issue and check-in at an airport counter, and passage at the boarding gate can be performed for the reservation system 10 in a ticketless manner. The coupon ticket moving module 52 of the system performs a process for moving the coupon ticket issued for the distribution source card 24 to the distribution destination card 28 as another registration card. As for the movement of the coupon ticket in this case, the purchased coupon ticket in the coupon ticket issue information 64 recorded in the distribution source card 24 is recorded as coupon ticket movement information 66 onto the distribution destination card 28. With respect to the distribution destination card 28 which received the movement of the coupon ticket as well, in a manner similar to the distribution source card 24, all of the reservation of a boarding ticket, ticket issue and check-in at an airport counter, and passage at the boarding gate can be performed in a ticketless manner by the use processing module 48 of the reservation system 10. The temporary card issuing module 54 provided for the reservation system 10 moves the coupon ticket from the distribution source card 24 to the temporary card 30 as a target, which is not registered in the reservation system 10 and is temporarily used. Coupon ticket movement information 68 which is formed by moving the coupon ticket to the temporary card 30 is substantially the same as the coupon ticket movement information 66 in the distribution destination card 28 using the registration card and information indicative of the card attribute, namely, the card kind shows a temporary card. Further, in the reservation system 10, by the process of the use processing module 48 using the distribution source card 24, distribution destination card 28, or temporary card 30, a magnetic card 70 which can be used as a boarding ticket or a ticket 72 which is ordinarily outputted as a paper can be also issued for the boarding reservation using the coupon ticket.

Figure 4:
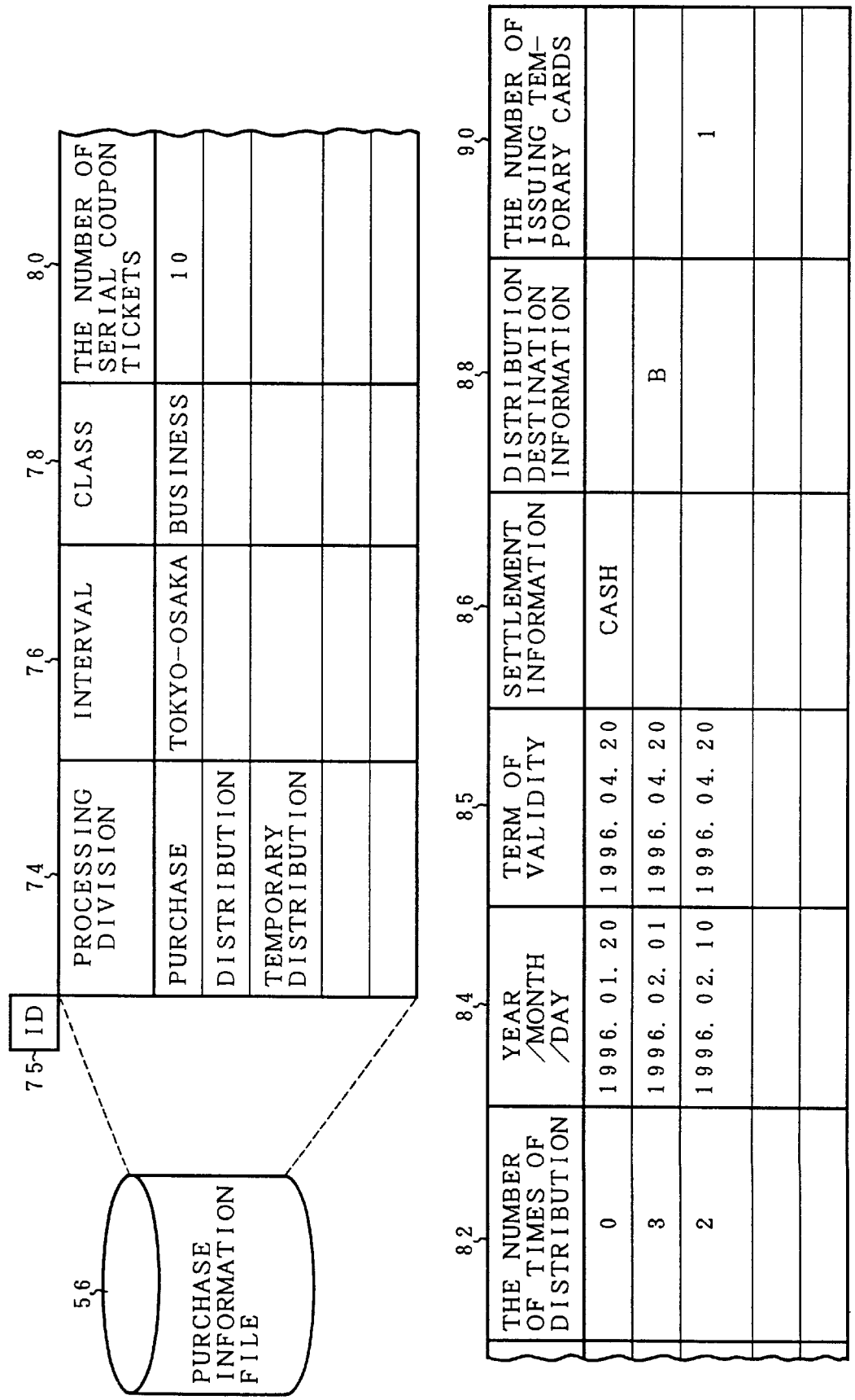
FIG. 4 is an explanatory diagram of a purchase information file of the invention.

Recording and management contents of the purchase information file 56, career information file 58, customer information file 60, coupon ticket issue information file 61, coupon ticket movement information file 62, and discount rate information file 63 provided for the reservation system 10 will now be described. FIG. 4 is an explanatory diagram of the purchase information file. The purchase information of the user issued to the IC card is recorded and managed in the system. That is, in the purchase information file 56, a processing division 74, an interval 76, a class 78, the number of serial coupon tickets 80, the number of times of distribution 82, processing year/month/day 84, a term of validity 85 by the year/month/day or the number of months, settlement information 86, distribution destination information 88, and further, the number of issuing temporary cards 90 are recorded and managed. In the processing division 74, a purchase of the coupon ticket by the distribution source card 24 in FIG. 3, a distribution to move the coupon ticket to the distribution destination card 28, and further, a temporary distribution due to the issue of the temporary card 30 are recorded. The subsequent interval 76 and class 78 show information of the use range of the coupon ticket. In this example, it indicates a business class between "Tokyo—Osaka". In this instance, since the distribution and temporary distribution in the processing division 74 are the same with respect to the interval 76 and class 78, they are not recorded in particular. Even if they are recorded, there will be no problem. The number of serial coupon tickets 80 indicates the number of using times of the coupon ticket purchased. In this example, it indicates 10 times. The number of times of distribution 82 is recorded with respect to each of the distribution and the temporary distribution in the processing division 74. The information indicating that the number of using times is equal to 3 times with respect to the distribution is recorded and information indicating that the number of using times is equal to 2 times with respect to the temporary distribution is recorded. In the processing year/month/day 84, the year/month/day when the purchase, distribution, or temporary distribution was performed are recorded, respectively. In the settlement information 86, information indicating that a settlement at the time of the purchase of the coupon ticket was performed by, for example, cash is recorded. In the distribution destination information 88, with respect to "distribution" which means the coupon ticket movement in the processing division 74 for the registration card as a target, a customer ID=B indicative of the card on the distribution destination side and the holder is recorded. In the number of issuing temporary cards 90 as a final item, the number of temporary cards issued by "temporary distribution" in the processing division is recorded. By seeing such contents in the purchase information file 56, situations of the purchase of the airline coupon ticket for the IC card owned by the card holder decided by an IC code 75, the distribution by the movement to the other registration card, and further, the temporary distribution using the temporary card can be managed in a lump.

Figure 5:
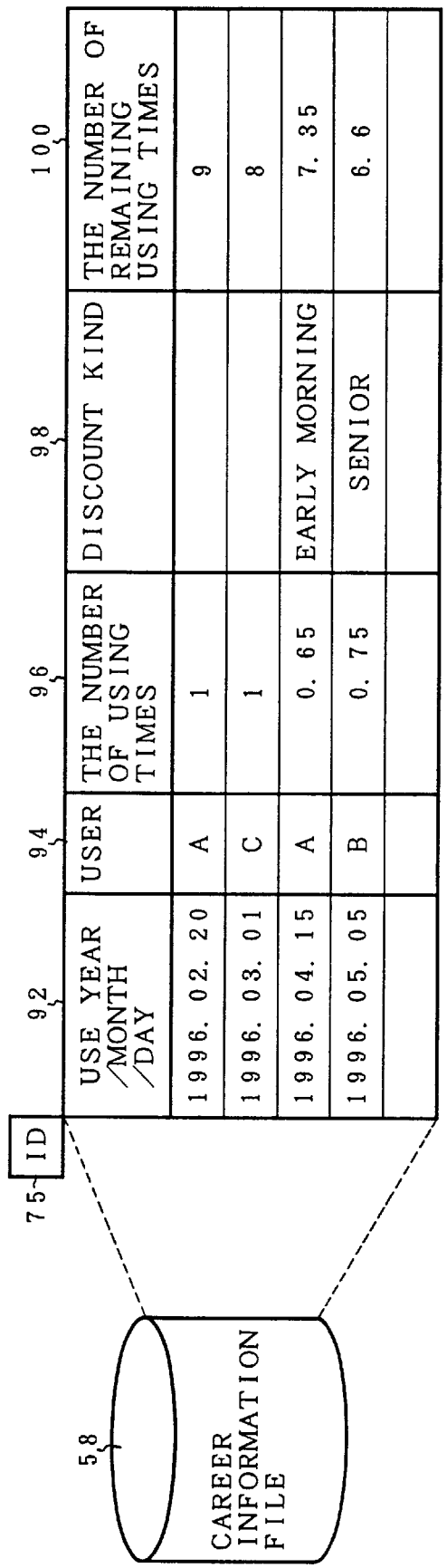
FIG. 5 is an explanatory diagram of a career information file of the invention.

FIG. 5 is an explanatory diagram of the career information file 58 in FIG. 3. The career information file 58 is managed by recording use situation of the issued coupon ticket. Namely, in a manner similar to the purchase information file 56 in FIG. 4 of the career information file 58, the ID code 75 indicative of the holder of the distribution source card 24 who purchased the coupon ticket first in FIG. 3 is used as an index and a use year/month/day 92, a user 94, the number of using times 96, a discount kind 98, and the number of remaining using times 100 are recorded, thereby managing. In the career information file 58, the distribution destination card 28 or temporary card 30 serving as a movement destination of the coupon ticket is not recorded but how the coupon ticket of the distribution source card 24 serving as a purchase destination is used is recorded. When seeing the use contents of the career information file 58, it will be understood that the user 94 also has distributed the coupon ticket to persons B and C other than a person himself A designated by the ID code 75. Among them, with respect to the person himself A, for example, an "early morning discount" in which a departure time is before seven o'clock is received as a discount kind 98. Therefore, by applying a discount rate of the "early morning discount", which will be obviously explained hereinlater, the number of using times 96 is set to 0.65 time, so that the number of remaining using times is changed from 8 times to 7.35 times. Further, in the user B of the user 94, the discount kind 98 is set to "senior" for elderly persons as targets, so that the number of using times 96 is equal to 0.75 time and the number of remaining using times 100 is equal to 6.6 times. From the career information file 58, it will be understood that in addition to the holder himself A, the users B and C possess the same coupon ticket. The number of remaining using times 100 based on the number of using times in which the user B other than the person himself A received the discount is not recorded to the number of remaining using times of the distribution destination card 28 which the user B other than the person himself possesses but is all recorded to the number of remaining using times in the distribution source card 24 of the holder himself A.

Figure 6:
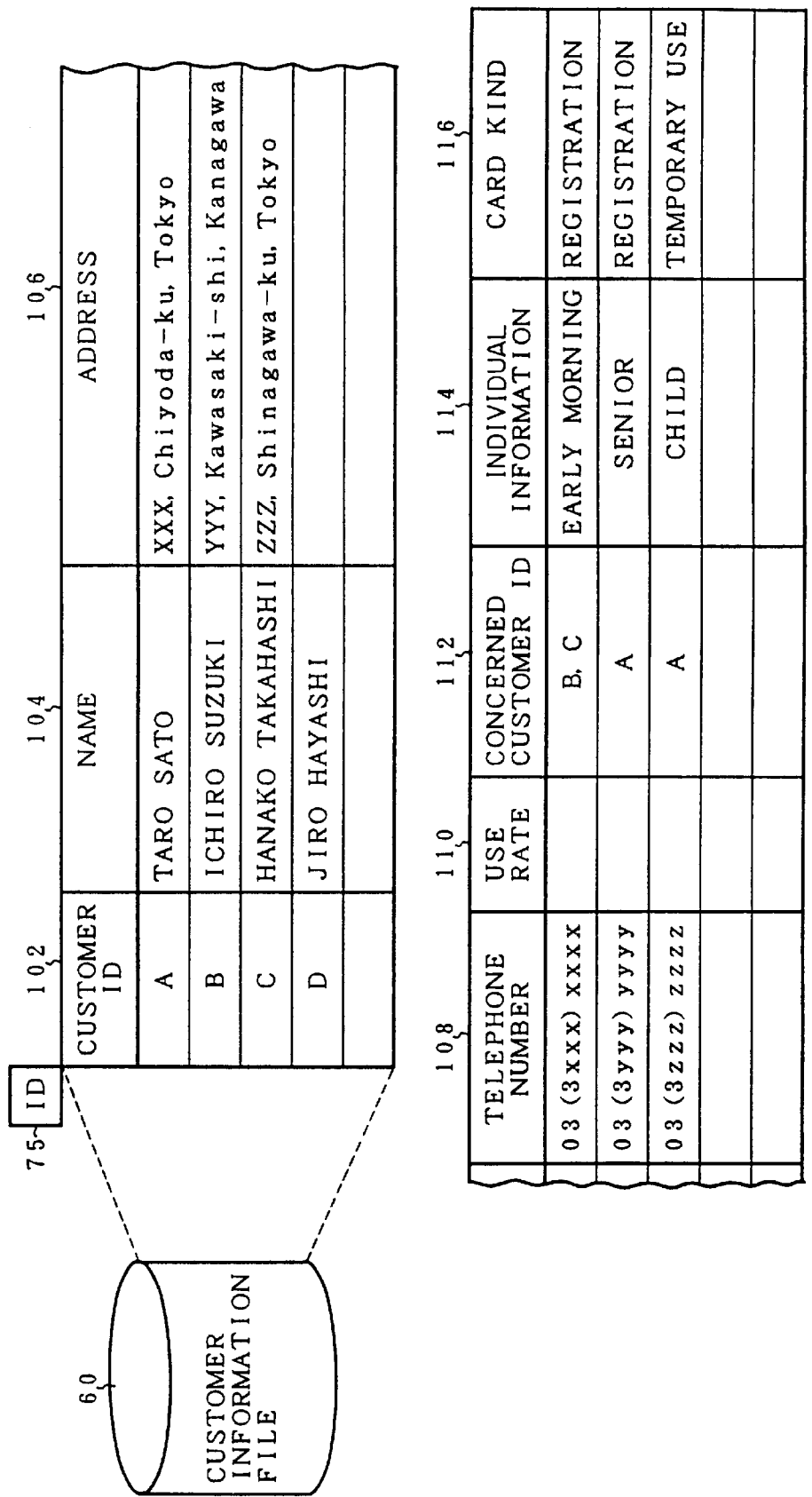
FIG. 6 is an explanatory diagram of a customer information file of the invention.

FIG. 6 is an explanatory diagram of the customer information file 60 provided for the reservation system 10 in FIG. 3. The customer information file 60 records the individual information regarding the user of the issued coupon ticket. Namely, the ID code 75 of the holder A of the distribution source card 24 who purchased the coupon ticket of the customer information file 60 is used as an index and the file is managed. A customer ID 102, a name 104, an address 106, a telephone number 108, a use rate 110, a concerned customer ID 112, individual information 114, and a card kind 116 are recorded and managed. In the customer ID 102, ID=A denotes the holder himself who possesses the distribution source card 24 of the coupon ticket, the customer ID=B denotes another holder who possesses the distribution destination card 28 which received the movement of the coupon ticket, and further, the customer ID=C denotes the user who possesses the temporary card which received the movement of the coupon ticket. From this relation, as for the user of the customer ID=A as a holder himself of the coupon ticket, the customers ID=B, C are recorded as a concerned customer ID 112. On the other hand, with regard to the concerned customer ID 112 of the customers ID=B, C which received the movement of the coupon ticket, the customer ID=A serving as a movement source is recorded. The individual information 114 is personal information about the coupon ticket discount of the user registered. As for the customer ID=A as a holder himself of the coupon ticket, "early morning" is applied. As for the customer ID=B who received the movement of the coupon ticket, since he is a person of an advanced age, "senior" is applied. Further, with respect to the customer ID=C, "child" is applied. The card kind 116 as a last item is a kind of IC card issued by the system. As for the customers ID=A, B, they relate to the registration cards registered in the system. As for the customer ID=C, he relates to the temporary card that is temporarily used. Further, as for the customer ID=D, he is a user in which the movement of the coupon ticket is scheduled from the customer ID=A as a holder of the distribution source card 24. However, since none of the registration card and the temporary card is issued, there is only the name 104 and the other items are held in blank.

Figure 7:
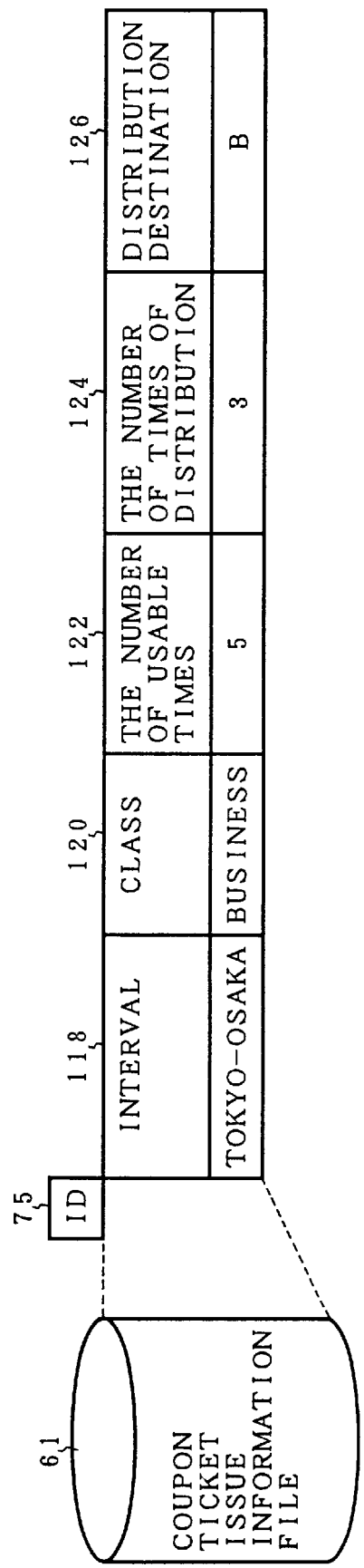
FIG. 7 is an explanatory diagram of a coupon ticket issue information file of the invention.

FIG. 7 is an explanatory diagram of the coupon ticket issue information file 61 provided for the reservation system 10 in FIG. 3. In the coupon ticket issue information file 61, the ID code 75 indicative of the owner of the distribution source card 24 who purchased the coupon ticket is used as an index and the present state about the issued coupon ticket is recorded and managed. That is, an interval 118, a class 120, the number of usable times (the number of remaining using times) 122, the number of times of distribution 124, and further, a distribution destination 126 are recorded. In the example, the number of usable times 122 of the present coupon ticket, namely, the number of remaining using times is equal to 5 times, the number of times of distribution 124 in which the coupon ticket was moved is equal to 3 times, and the distribution destination 126 is set to ID=B.

Figure 8:
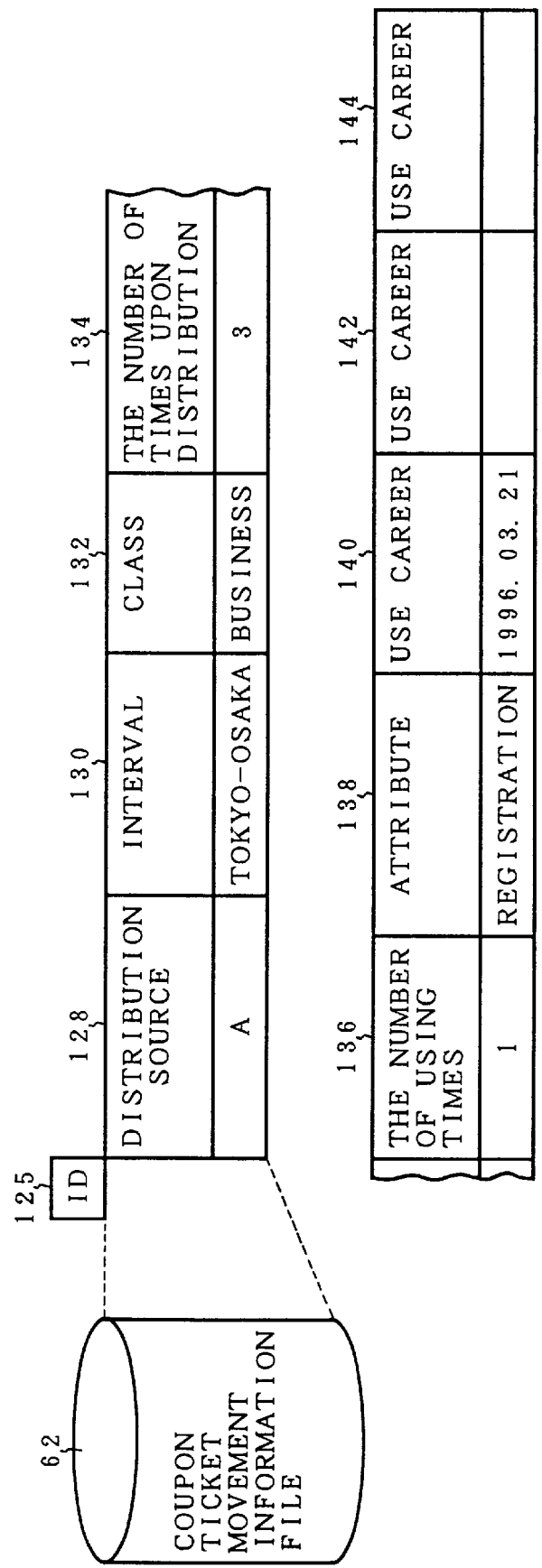
FIG. 8 is an explanatory diagram of a coupon ticket movement information file of the invention.

FIG. 8 shows the coupon ticket movement information file 62 provided for the reservation system 10 in FIG. 3. The coupon ticket information of the movement destination is recorded and managed in the coupon ticket movement information file 62. Namely, an ID code 125 indicative of the movement destination of the coupon ticket is used as an index and a distribution source 128, an interval 130, a class 132, the number of times 134 upon distribution, the number of using times 136, a card attribute 138, and careers 140 to 144 are provided. ID=A as a holder of the distribution source card 24 who purchased the coupon ticket is recorded in the distribution source 128. The number of times 134 upon distribution is set by the movement of the coupon ticket and, in this case, the coupon tickets as many as three times have been moved. The number of using times 136 is the number of using times of the distribution destination card 28 by the movement information of the coupon ticket and is equal to one time. The card attribute 138 denotes the kind of IC card of the movement destination and is either one of the registration card and the temporary card. In this case, it is set to the registration card. For example, use year/month/day are recorded in the use careers 140 to 144. In this case, since the number of using times 136 is equal to one time, the use year/month/day are recorded in the use career 140.

Figure 9:
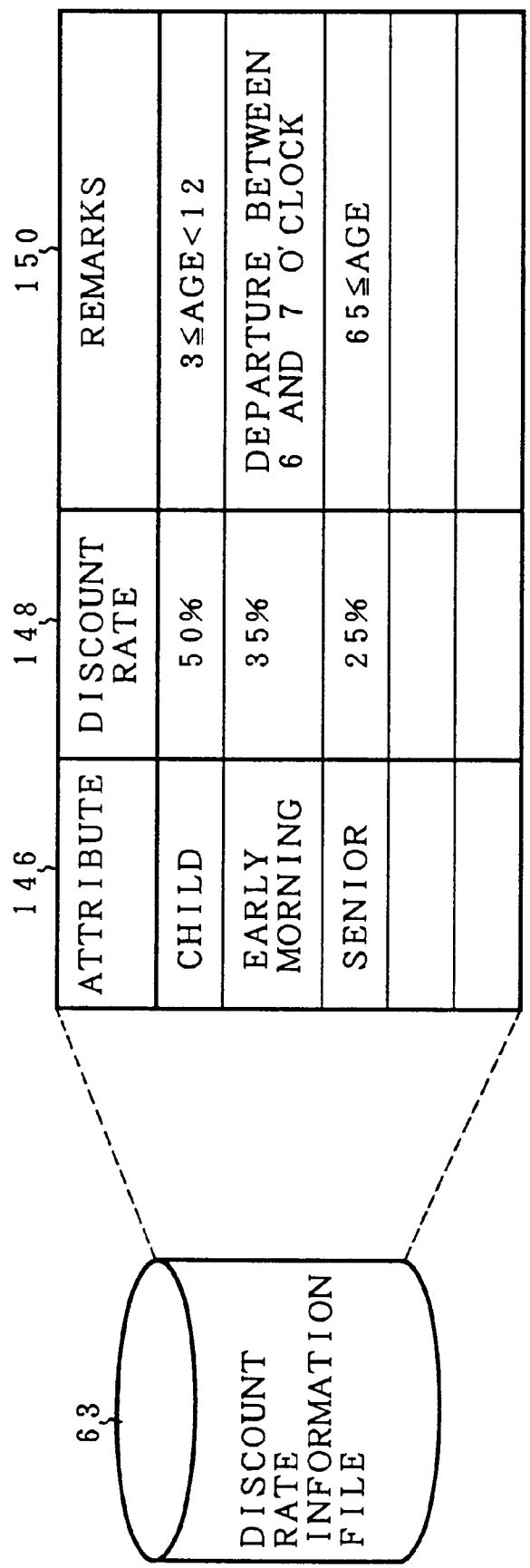
FIG. 9 is an explanatory diagram of a discount rate information file of the invention.

FIG. 9 shows the discount rate information file 63 provided for the reservation system 10 in FIG. 3 and it is constructed by an attribute 146, a discount rate 148, and remarks 150. As an attribute 146, in this example, three kinds of "child", "early morning", and "senior" are recorded and a predetermined value is recorded as a discount rate 148 with respect to each of them. Conditions necessary for the attribute 146 are described in the remarks 150.

Figure 10:
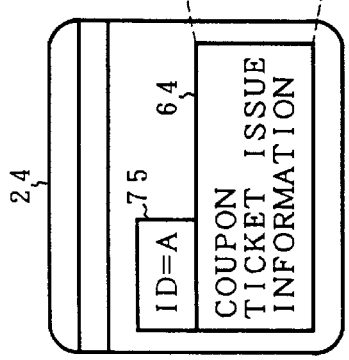
FIG. 10 is an explanatory diagram of a distribution source card and coupon ticket issue information of the invention.

The coupon ticket issue information 64 and coupon ticket movement information 66 and 68 stored in each of the distribution source card 24, distribution destination card 28, and temporary card 30 which are used as ticketless means by the reservation system 10 in FIG. 3 will now be described. FIG. 10 shows the distribution source card 24 on which the coupon ticket issue information 64 has been recorded by the purchase of the coupon ticket. The coupon ticket issue information 64 is recorded together with the ID code A as an ID code 75 indicative of the holder of the distribution source card 24. As coupon ticket issue information 64, an interval 162, a class 164, the number of serial coupon tickets 166, the number of using times 168, the number of times of distribution 170, the number of remaining using times 172, individual information 174, an attribute 176, purchase year/month/day 178, a term of validity (year/month/day or the number of months) 179, an issuing location 180, and an issuing enterprise 182 are recorded. As for the coupon ticket issue information 64 of the distribution source card 24 as mentioned above, when the coupon ticket is moved from the distribution source card 24 or when the card is used for a reservation of the boarding ticket, issue, check-in, passage at a boarding gate, or the like, the necessary information contents are updated by the system.

Figure 11:
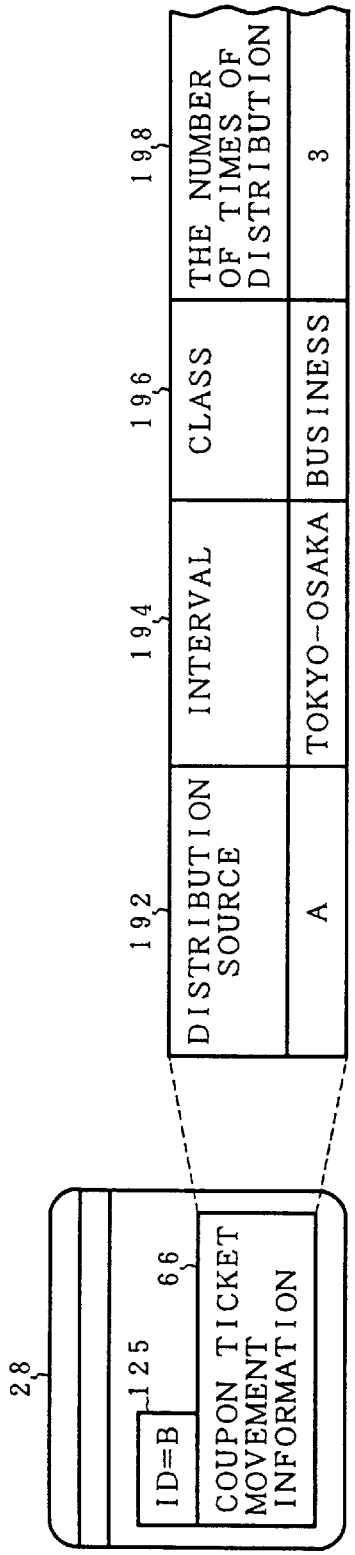
FIG. 11 is an explanatory diagram of a distribution destination card and coupon ticket movement information of the invention.

FIG. 11 shows the distribution destination card 28 in which the coupon ticket is moved and used and which is used in the invention. As an ID code 125 indicative of the holder as a card owner, the coupon ticket movement information 66 is recorded together with ID=B in the distribution destination card 28. ID=A of the distribution source card 24 in FIG. 10 indicative of a distribution source 192 is recorded in the head of the coupon ticket movement information 66 of the distribution destination card 28. ID=A indicative of the distribution source 192 provides a function as a front cover of the coupon ticket indicative of the coupon ticket of the same holder when the coupon ticket is purchased by the distribution source card 24 in FIG. 10. Namely, the coupon ticket is a kind of discount ticket and the use by the person himself who purchased is a principle rule. Therefore, when making a reservation by using the coupon ticket, it is obliged to confirm that the person who makes a reservation is the person himself who purchased the coupon ticket. However, the distribution destination card 28 receives the movement of the coupon ticket from the distribution source card 24 serving as the purchaser himself instead of the coupon ticket of the purchaser himself. The purchaser himself cannot be confirmed from ID=B of the distribution destination card 28. Therefore, by recording ID=A of the distribution source 192 indicative of the purchaser himself, the confirmation of the purchaser himself upon using of the coupon ticket, what is called, a front cover function of the coupon ticket is realized. Subsequent to the distribution source 192, in a manner similar to the case of the distribution source card 24 in FIG. 10, an interval 194, a class 196, the number of times of distribution 198, the number of using times 200, the number of remaining using times 202, individual information 204, an attribute 206, movement year/month/day 208, a term of validity (year/month/day or the number of months) 209, an issuing location 210, and an issuing enterprise 212 are recorded.

Figure 12:
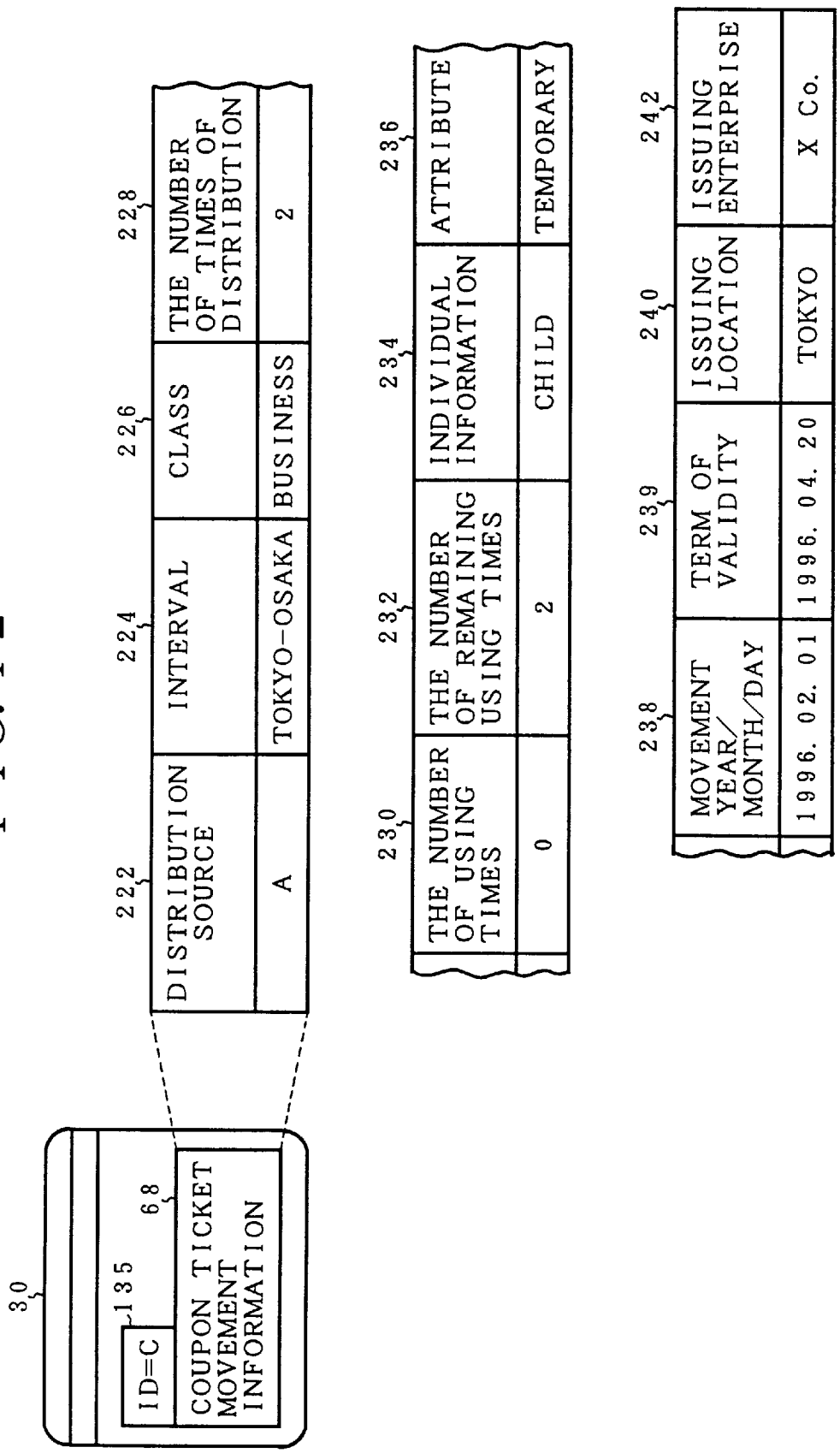
FIG. 12 is an explanatory diagram of a temporary card and the coupon ticket movement information of the invention.

FIG. 12 shows the temporary card 30 that is used in the invention. ID=C is recorded in the temporary card 30 as an ID code 135 indicative of the user which was allocated when the temporary card 30 is issued. Further, the coupon ticket movement information 68 of the coupon ticket which was moved from the coupon ticket issue information 64 of the distribution source card 24 in FIG. 10 is recorded. The coupon ticket movement information 68 is also fundamentally similar to the distribution destination card 28 in FIG. 11. A distribution source 222, an interval 224, a class 226, the number of times of distribution 228, the number of using times 230, the number of remaining using times 232, individual information 234, an attribute 236, movement year/month/day 238, a term of validity (year/month/day or the number of months) 239, an issuing location 240, and an issuing enterprise 242 which function as a front cover of the coupon ticket are recorded. The coupon ticket movement information 68 differs from the card 28 with respect to a point that the attribute 236 is "temporary".

In the reservation system 10 according to the invention of FIG. 3, the recording and management of the coupon ticket information in each of the distribution source card 24, distribution destination card 28, and temporary card 30 are executed by the recording management of each information file in FIGS. 4 to 9. At the same time, by using the information regarding the users which is derived through the use of the coupon ticket, an access and an information formation for getting new customers who use the coupon tickets which are issued by the reservation system 10 can be dynamically executed. For example, the owner of the distribution source card 24 who purchases and uses the coupon ticket is an excellent customer when it is seen from a service enterprise which provides the reservation system 10. A possibility such that the owner of the distribution destination card 28 who received the distribution of the coupon ticket from the excellent customer and the owner of the temporary card 30 are also excellent customers is high. Therefore, when using the distribution destination card 28 or temporary card 30, a message indicating that they are the excellent customers but are not yet registered in the system is outputted to the operator or the like on the reservation system 10 side. An explanation or guidance for a purchase of the coupon ticket is actively executed to the owner of the distribution destination card 28, thereby capturing such an owner as a customer of the system. Or, a possession of a registration card of the reservation system 10 is recommended to the owner of the temporary card 30 or the like. In this way, the invention can be largely used for an activity to keep a new customer.

Figure 13:
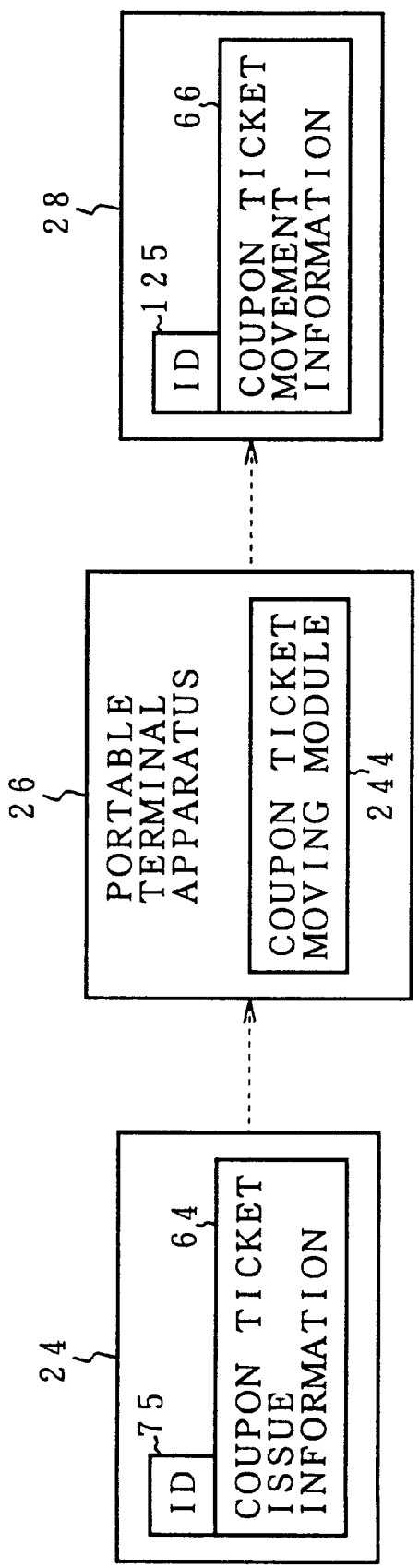
FIG. 13 is an explanatory diagram of a distributing process of a coupon ticket of the invention using a portable terminal.

FIG. 13 is a functional block diagram of a moving process of a coupon ticket by a portable terminal apparatus which is shown in FIG. 1 and is owned by the user. A coupon ticket moving module 244 has been installed as software that enables the movement of the coupon ticket in the system of the invention in the portable terminal apparatus 26 such as a personal computer or the like which the user possesses. Simultaneously with that the coupon ticket moving module 244 is installed, the portable terminal apparatus 26 has a reader/writer of the IC card as an input/output device. The distribution source card 24 which received the issue of the coupon ticket from the system is set into the portable terminal apparatus 26 in which such a coupon ticket moving module 244 has been installed. Processes such that the coupon ticket which is provided by the coupon ticket issue information 64 is registered as coupon ticket movement information 66 into the distribution destination card 28 as another registration card of the system and the purchased coupon ticket is distributed to other users and used can be simply performed on the user side.

Figure 14:
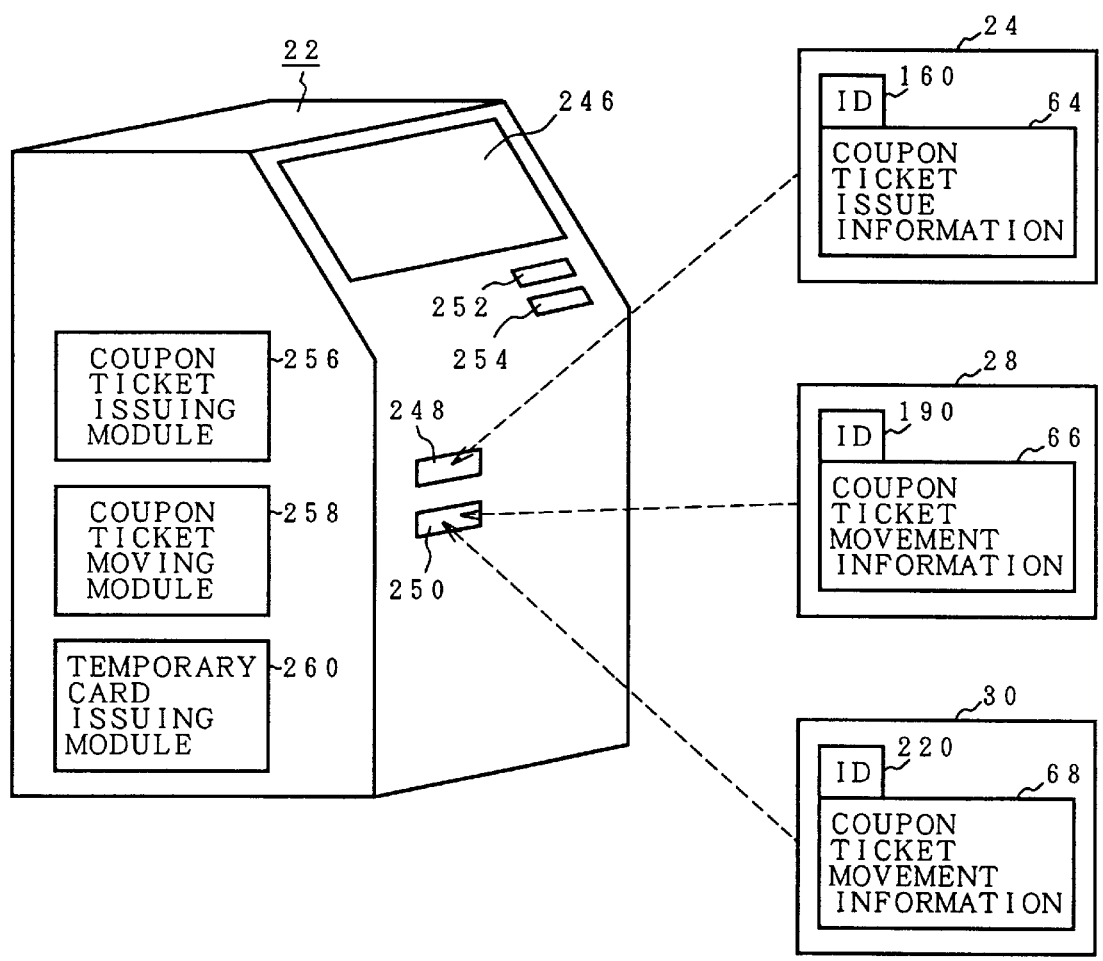
FIG. 14 is an explanatory diagram of an issue and a distribution of the coupon ticket of the invention using an automatic ticket issuing machine.

FIG. 14 is a functional block diagram for an issue and a movement of coupon tickets by the automatic ticket issuing machines 22-1 to 22-n provided for the reservation system 10 in FIG. 1. First, the automatic ticket issuing machine 22 has a liquid crystal display 246, IC card ejecting/inserting slots 248 and 250, a magnetic card ejecting/inserting slot 252, and further, a ticket ejecting/inserting slot 254 on an operation panel. Functions of a coupon ticket issuing module 256, a coupon ticket moving module 258, and a temporary card issuing module 260 have been installed as software in the automatic ticket issuing machine 22 by a processor or the like. By using such an automatic ticket issuing machine 22, a purchase of the coupon ticket by using the distribution source card 24, a movement of the coupon ticket from the distribution source card 24 to the distribution destination card 28, further, an issue of the temporary card 30 by the distribution source card 24, and a movement of the coupon ticket to the temporary card 30 can be simply executed by the operation on the user side.

Figure 15:
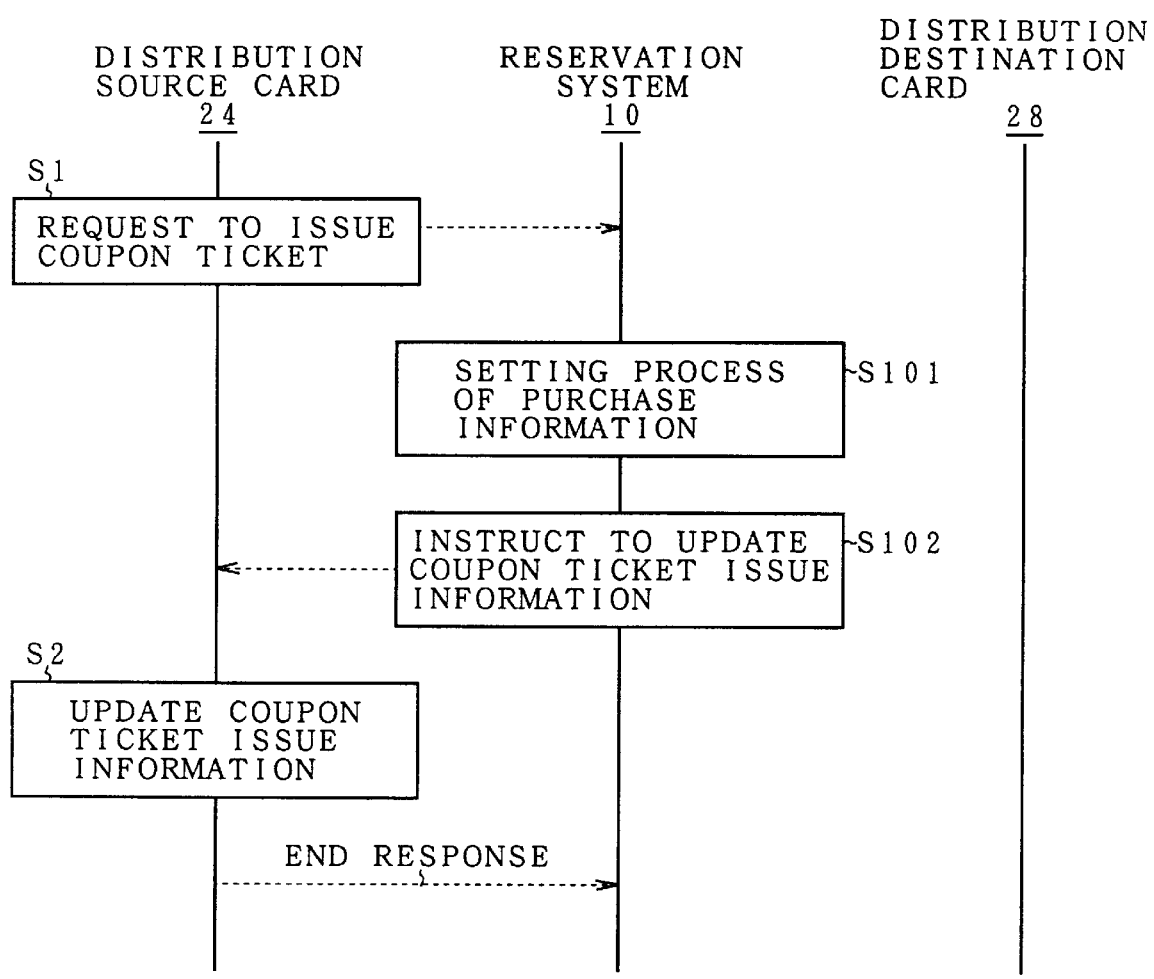
FIG. 15 is a time chart for a coupon ticket issuing process for the distribution source card.

A processing procedure about each of a purchase of the coupon ticket, a use of the purchased coupon ticket, a movement of the coupon ticket, and an issue of the temporary card in the ticketless system of the invention will now be described. FIG. 15 is a time chart for an issuing process of the distribution source card when the coupon ticket is purchased in the ticketless system of the invention. First, the distribution source card 24 is set into a counter terminal apparatus or an automatic ticket issuing machine provided for the reservation system 10 and an issue of a coupon ticket is requested in step S1. When the issue of the coupon ticket is requested, an interval, a class, and the number of issuing times which are necessary are inputted to the coupon ticket issue information 64 shown in FIG. 10. In the request to issue the coupon ticket in step SI, in addition to the information that was inputted by the user and is necessary to issue the coupon ticket, a collation is performed between the distribution source card 24 and the reservation system 10 by transmitting and receiving a predetermined identification code, thereby collating that the distribution source card 24 relates to the legal purchase of the coupon ticket by the holder himself which has previously been registered in the reservation system 10. As an identification code, for instance, a personal identification code of four digits which the user applied when the distribution source card 24 is issued to the user by the reservation system 10 is used. The system which receives the coupon ticket issuing request from the distribution source card 24 executes a setting process of the coupon ticket purchase information in step S101. Namely, a process to set and record the information derived when the coupon ticket is issued is executed for the purchase information file 56 shown in FIG. 4. Subsequently, the reservation system 10 instructs to update the coupon ticket issue information to the distribution source card 24 in step S102. That is, on the basis of the purchase information set in step S101, various information which is necessary for updating the coupon ticket issue information 64 for the distribution source card 24 shown in FIG. 10 is formed, the coupon ticket issue information is sent to the distribution source card 24, and an updating is instructed. In response to the updating instruction of the coupon ticket issue information from the reservation system 10, in step S2, the coupon ticket issue information is updated on the distribution source card 24 side. Thus, the coupon ticket issue information as a purchase result of the coupon ticket is recorded into the distribution source card 24. For the reservation system 10, the distribution source card 24 can be used in a range of the coupon ticket for the purpose of a reservation of a boarding ticket.

Figure 16:
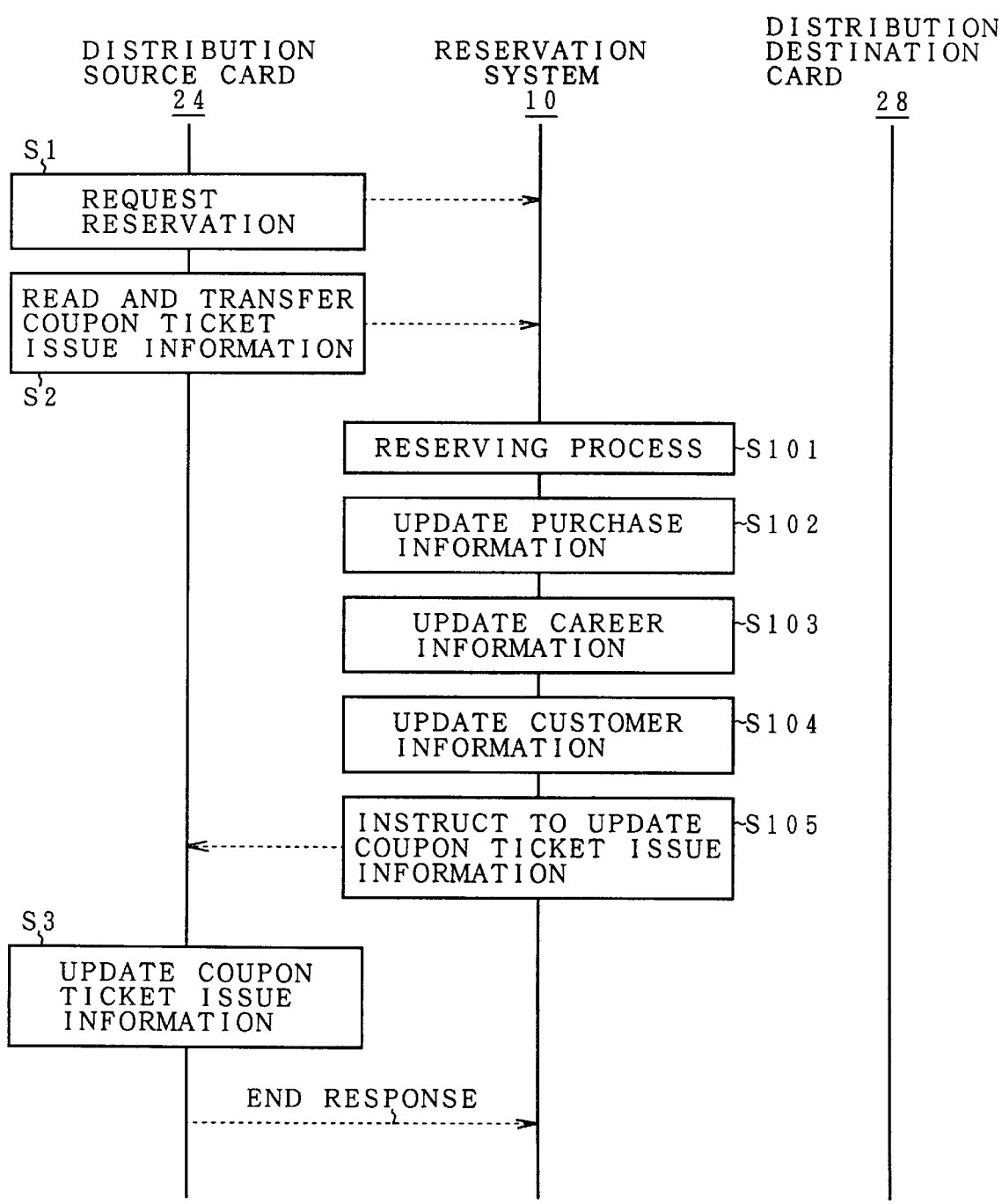
FIG. 16 is a time chart for a reserving process using the distribution source card.

FIG. 16 shows a fundamental procedure for a boarding ticket reserving process using the distribution source card 24 in which the coupon ticket is purchased in FIG. 15. In the reservation of the boarding ticket using the distribution source card 24, first, the distribution source card 24 is set into the counter terminal apparatus or automatic ticket issuing machine of the reservation system 10 and a reservation request in which use year/month/day, a flight name, a departure time, and the like are designated is executed. Simultaneously with the reservation request, on the distribution source card 24 side, a reading transfer operation of the coupon ticket issue information is executed for the reservation system 10 in step S2. Even in the reservation request as well, in a manner similar to the issue of the coupon ticket in FIG. 15, a predetermined identification code is sent from the distribution source card 24 side. On the reservation system 10 side, a point that the reservation has been made by the coupon ticket using the distribution source card 24 by the legal holder is confirmed by collating with the registered identification code, thereby eliminating the illegal use. The reservation system 10 which receives the reservation request from the distribution source card 24 side and the transfer of the coupon ticket issue information executes a reserving process to get the boarding ticket with regard to the requested reservation contents in step S101. If the reservation can be made, the reservation system 10 outputs or prints out a message indicative of a reservation result to the user side. In step S102, with respect to a region in the purchase information file 56 in FIG. 4 which is designated by the ID code 75, the purchase information is updated as necessary. In this case, since the distribution source card 24 itself in which the coupon ticket was purchased is used, there is no need to update the purchase information. In step S103, with respect to a region in the career information file 58 in FIG. 5 which is designated by the ID code 75, the necessary information is updated. In this case, since the user is the holder himself of the distribution source card 24, subsequent to the use year/month/day 92, the ID code=A of the holder himself is recorded in the user 94, the number of using times 96 is set to 1, and further, the number of remaining using times 100 is reduced to 9. In step S104, the customer information file 60 shown in FIG. 6 is updated as necessary. In this case, since the purchaser himself of the coupon ticket uses and the customer information of himself has already been recorded at the time of the purchase of the coupon ticket, there is no need to update. In step S105, the updating of the coupon ticket issue information is instructed. In this instance, with respect to the coupon ticket issue information file 61 provided for the reservation system 10 in FIG. 7, the number of usable times 122 is reduced by 1. Similarly, an updating instruction to increase the value of the number of using times 168 in the distribution source card 24 in FIG. 10 by 1 and to reduce the value of the number of remaining using times 172 by 1 is executed. In response to the updating instruction of the coupon ticket issue information by the reservation system 10, in step S2 on the distribution source card 24 side, the coupon ticket issue information 64 provided in the distribution source card 24 as shown in FIG. 10 is updated. After completion of the updating, an end response is returned to the reservation system 10 and a series of processes are finished.

Figure 17:
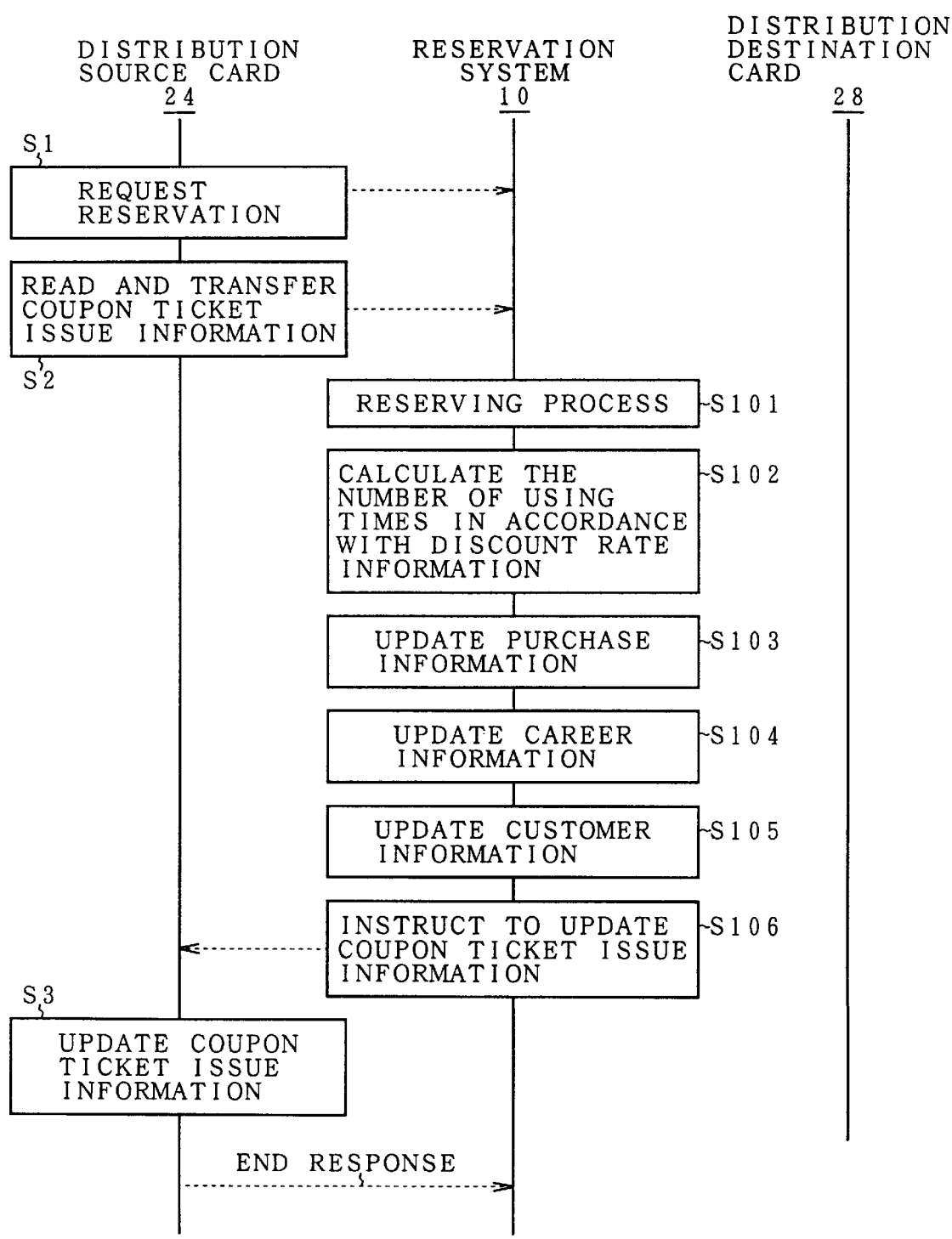
FIG. 17 is a time chart for a reserving process accompanying with a discount in accordance with the number of using times using the distribution source card.

FIG. 17 shows another procedure for a reserving process by a coupon ticket for the reservation system 10 using the distribution source card 24. This procedure is characterized in that in a process in step S102 in the reservation system 10, the number of using times is calculated in accordance with discount rate information and the updating of the career information file in step S104 is executed on the basis of a calculation result. The other processes are substantially the same as the procedure of FIG. 16. In the calculation of the number of using times according to the discount rate information in step S102, first, on the basis of the individual information 174 in FIG. 10 obtained by the reading transfer of the coupon ticket issue information in step S2 from the distribution source card 24, the attribute 146 in the discount rate information file 63 in FIG. 9 is discriminated and the value of the discount rate 148 corresponding to the relevant attribute 146 is read out. The discount rate is multiplied to one using time, thereby obtaining a calculation value of the number of using times. The calculation value of the number of using times calculated in step S102 is reflected to the updating of the career information file in FIG. 5 in step S104 and the number of using times 96 is recorded as a calculated value of 1 or less. The value of the number of remaining using times 100 is calculated by the calculation value of the number of using times in this instance and is used as the number of remaining using times of the coupon ticket in the distribution source card 24 at that time point.

Figure 18:
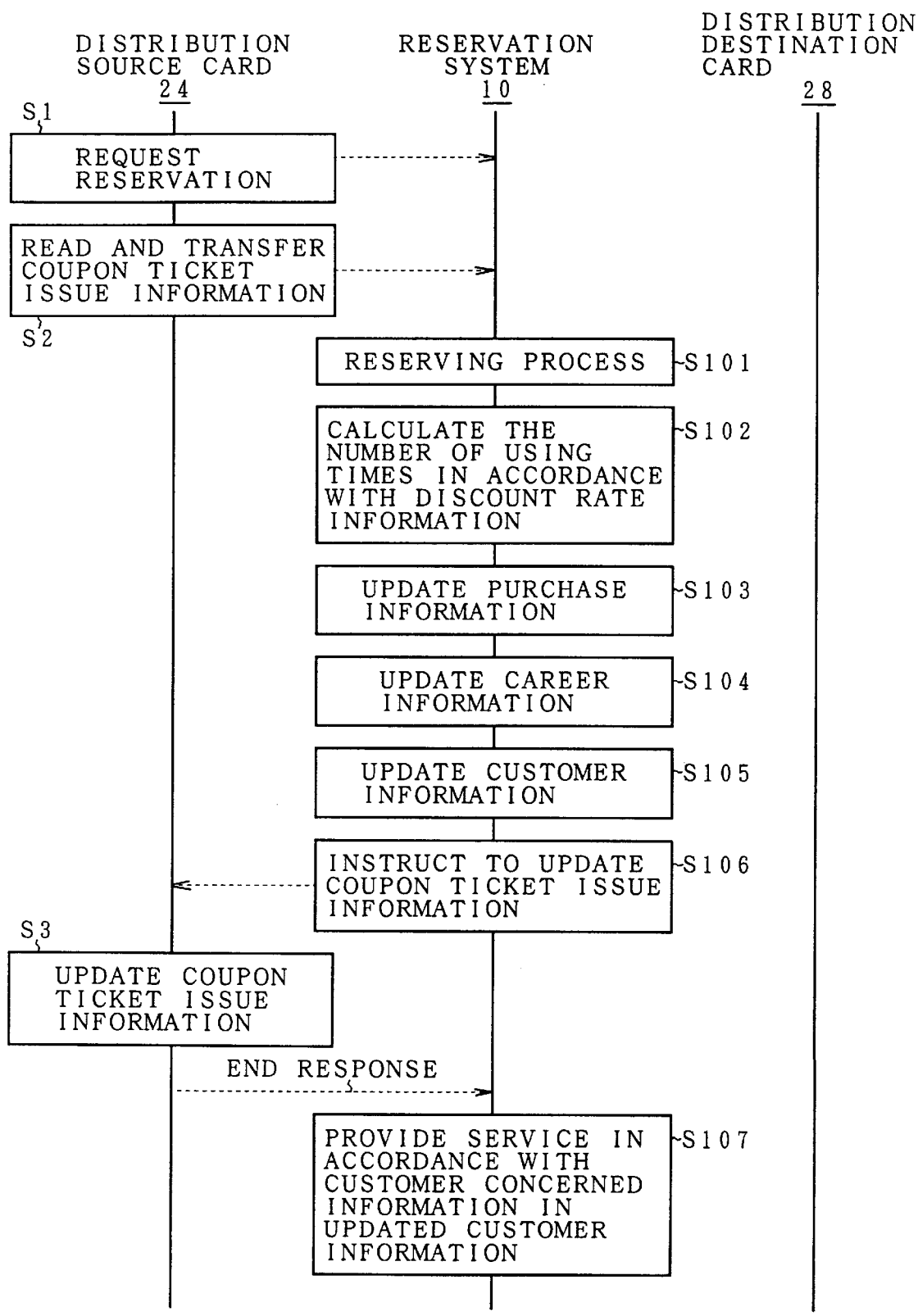
FIG. 18 is a time chart for a reserving process accompanying with a customer service using the distribution source card.

FIG. 18 shows another form of a procedure for a reservation of a boarding ticket for the reservation system 10 using the distribution source card 24 and is characterized in that in addition to the procedure of FIG. 17, further, a predetermined service is provided to the owner of the distribution source card 24 in accordance with the concerned customer information after the boarding reservation was obtained by the coupon ticket which had been purchased by the distribution source card 24. Namely, the processes in steps S1 to S4 in the distribution source card 24 and in steps S101 to S106 in the reservation system 10 are substantially the same as those in FIG. 17. In addition to them, the reservation system 10 further provides a predetermined service to the user of the distribution source card 24 using the reservation system 10 in accordance with the updated concerned customer ID 112 in the customer information file 60 shown in FIG. 6 after completion of the reserving process. As a service to be provided, for instance, there is a mileage in which a point is added every use or the like.

Figure 19:
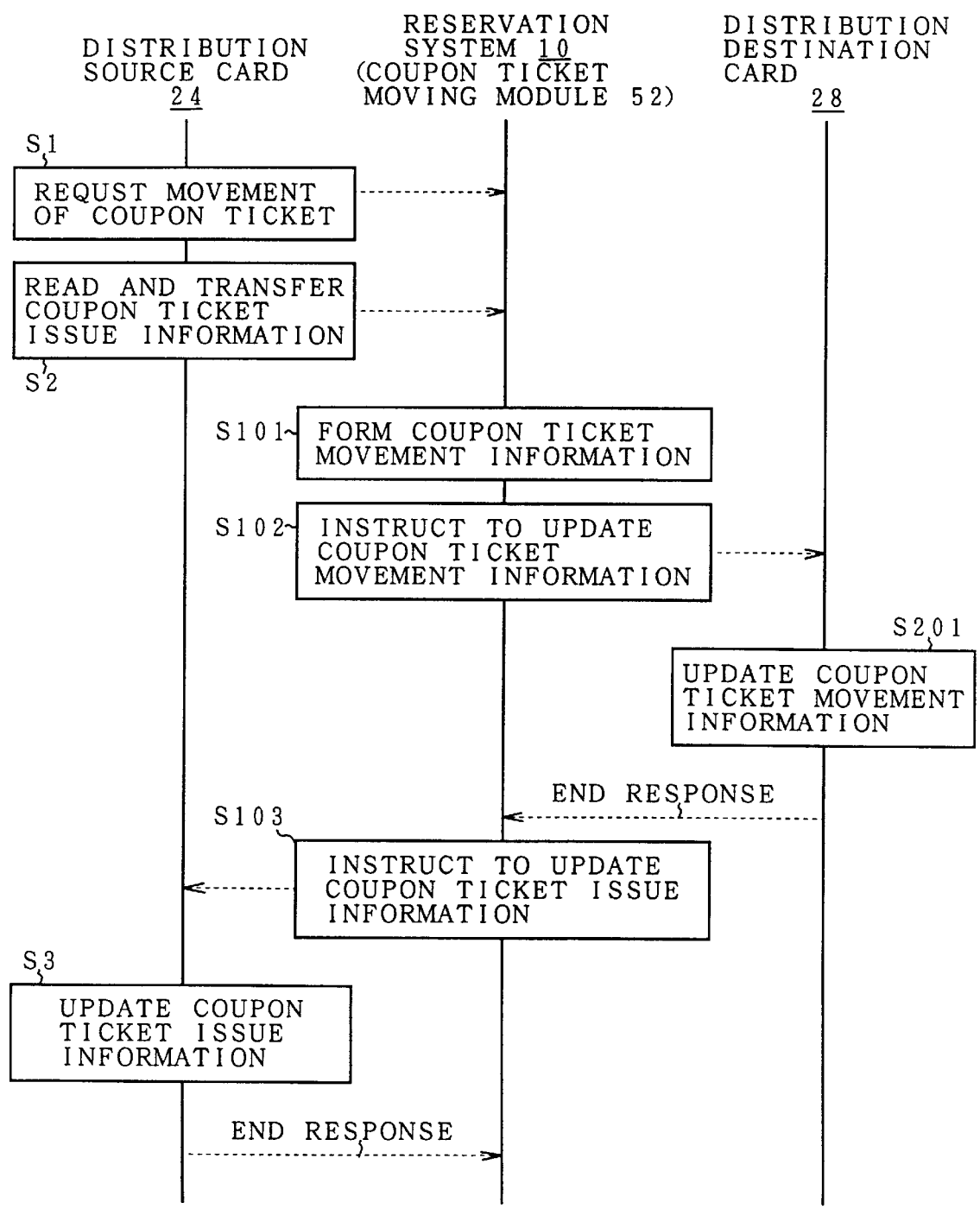
FIG. 19 is a time chart for a coupon ticket moving process from the distribution source card to the distribution destination card.

FIG. 19 is a flowchart for a processing procedure for moving the coupon ticket from the distribution source card 24 to the distribution destination card 28. First, by setting the distribution source card 24 into, for example, the counter terminal apparatus or automatic ticket issuing machine of the reservation system 10, a process by the coupon ticket moving module 52 is allowed to be executed. For this purpose, in step S1, a request to move the coupon ticket is issued from the distribution source card 24. In step S2, the coupon ticket issue information is read and transferred. As a request to move the coupon ticket, it is sufficient to merely designate the number of times of the coupon ticket to be moved. When the movement of the coupon ticket is requested, the user sends a predetermined identification code to the reservation system 10. On the reservation system 10 side, a point that the use is the legal use of the distribution source card 24 is confirmed by collating with the registered identification code. Subsequent processes are executed. The reservation system 10 which received the transfer of the coupon ticket moving request and the coupon ticket issue information forms the coupon ticket movement information in step S101. Specifically speaking, information to be registered into the coupon ticket movement information file 62 in FIG. 8 is formed. In the information, ID=A of the distribution source card 24 to be recorded to the distribution source 128 has an important meaning as front cover information of the coupon ticket indicating that the coupon ticket movement information of the distribution destination card 28 serving as a movement destination relates to the same purchaser as that of the coupon ticket issue information of the distribution source card 24. In step S102, the reservation system 10 instructs the distribution destination card 28 side to update the coupon ticket movement information. In this instance, since the automatic ticket issuing machine 22 provided for the reservation system 10 has the two IC card ejecting/inserting slots 248 and 250 as shown in, for example, FIG. 14, the moving operation of the coupon ticket in which both of the distribution source card 24 and distribution destination card 28 are simultaneously set can be realized. Therefore, the distribution destination card 28 side updates the coupon ticket movement information on the basis of the updating instruction of the coupon ticket movement information from the reservation system 10 in step S201. Namely, the contents of the coupon ticket movement information 66 of the distribution destination card 28 in FIG. 11 are recorded and updated. When an end response by the updating of the coupon ticket movement information 66 is obtained from the distribution destination card 28 side, the reservation system 10 updates the coupon ticket issue information 64 as shown in FIG. 10 for the distribution source card 24 in step S103. Specifically speaking, the value of the number of times of distribution 170 in the coupon ticket issue information 64 is increased by 1 and the number of remaining using times 172 is reduced by 1. It will be obviously understood that on the reservation system 10 side, in association with the movement of the coupon ticket, the updating of the corresponding information in "distribution" of the processing division 74 in the purchase information file 56 in FIG. 4 and the recording and updating of the corresponding information regarding the customer ID 102 of the distribution destination card 28 serving as a movement destination of the coupon ticket in the customer information file 60 in FIG. 6 are executed together.

Figure 20:
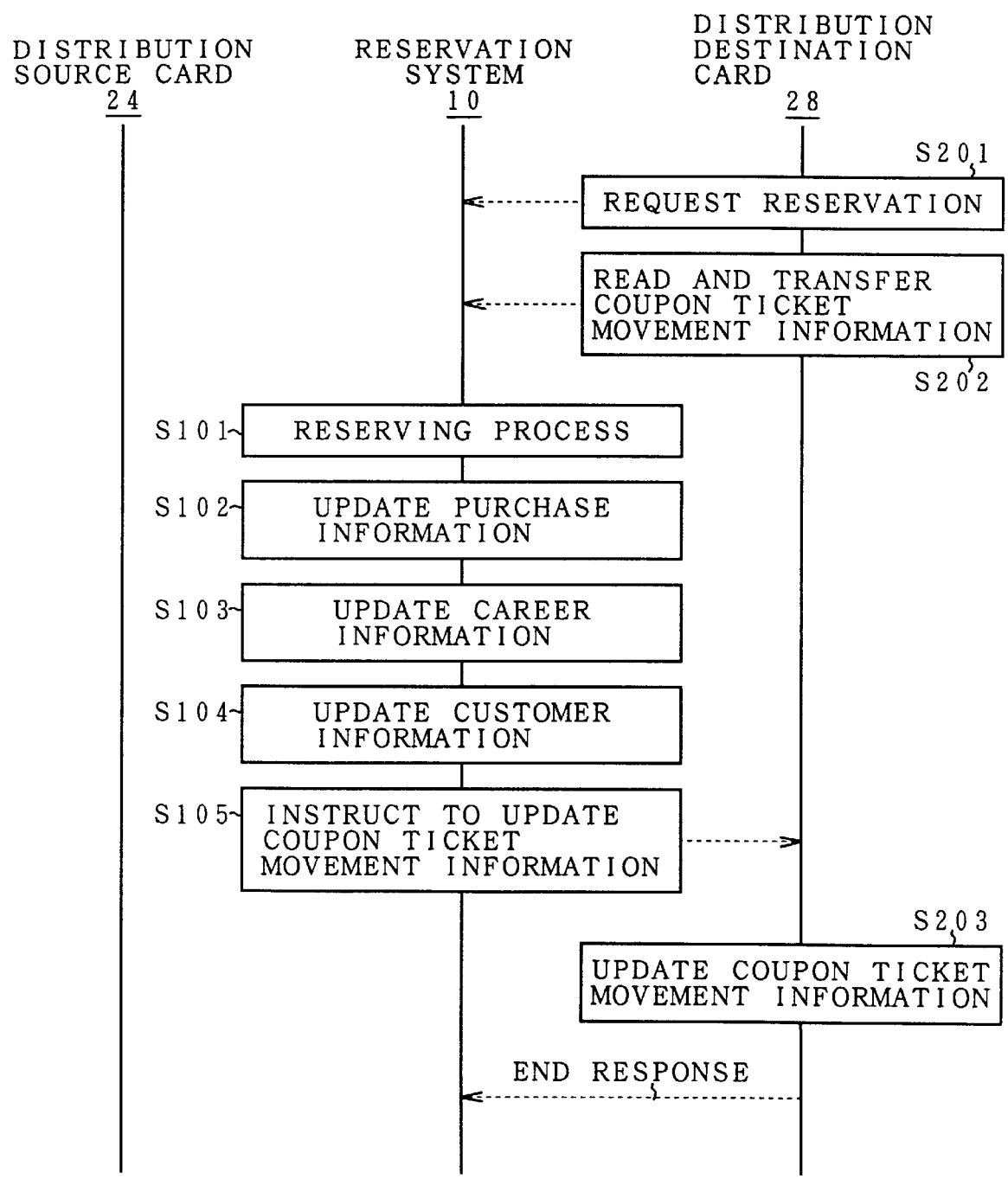
FIG. 20 is a time chart for a reserving process using the distribution destination card.

FIG. 20 is a time chart for a procedure of a boarding reservation by the distribution destination card 28 in which the coupon ticket was moved in FIG. 19. The reserving process using the distribution destination card 28 is fundamentally the same as the reserving process of the distribution source card 24 in FIG. 16 except that the reservation source is merely the distribution destination card 28. That is, in response to the reserving request in step S201 of the distribution destination card 28 and the reading transfer of the coupon ticket movement information in step S202, the reservation system 10 executes the reserving process in step S101 and obtains the boarding reservation. In steps S102 to S104, the purchase information file, the career information file, and further, the customer information file are updated. As for the updating of the purchase information file 56, with respect to a column of "distribution" of the processing division 74 in FIG. 4, the number of times of distribution 82, the distribution year/month/day 84, and further, the distribution destination information 88 are respectively recorded and registered. As for the career information file 58 in FIG. 5, in association with the use of the distribution destination card 28 which received the movement of the coupon ticket, at least the use year/month/day 92, the user 94, the number of using times 96, and the number of remaining using times 100 are updated. Further, in the customer information file 60 in FIG. 6, since the registration has already been finished at the time of the movement of the coupon ticket in FIG. 19, there is no need to update in this case. After completion of the updating of the various information files, in step S105, the updating of the coupon ticket movement information is instructed to the distribution destination card 28. Prior to updating the coupon ticket movement information, with respect to the coupon ticket movement information file 62 in FIG. 8, the number of using times 136 is increased by 1. The use year/month/day obtained by the reserving process are recorded in the use career 140. The distribution destination card 28 which received the updating instruction of the coupon ticket movement information from the reservation system 10 updates the coupon ticket movement information in step S203. Specifically speaking, in the coupon ticket movement information 66 recorded in the distribution destination card 28 in FIG. 11, the number of using times 200 is increased by 1 and the number of remaining using times 202 is decreased by 1.

Figure 21:
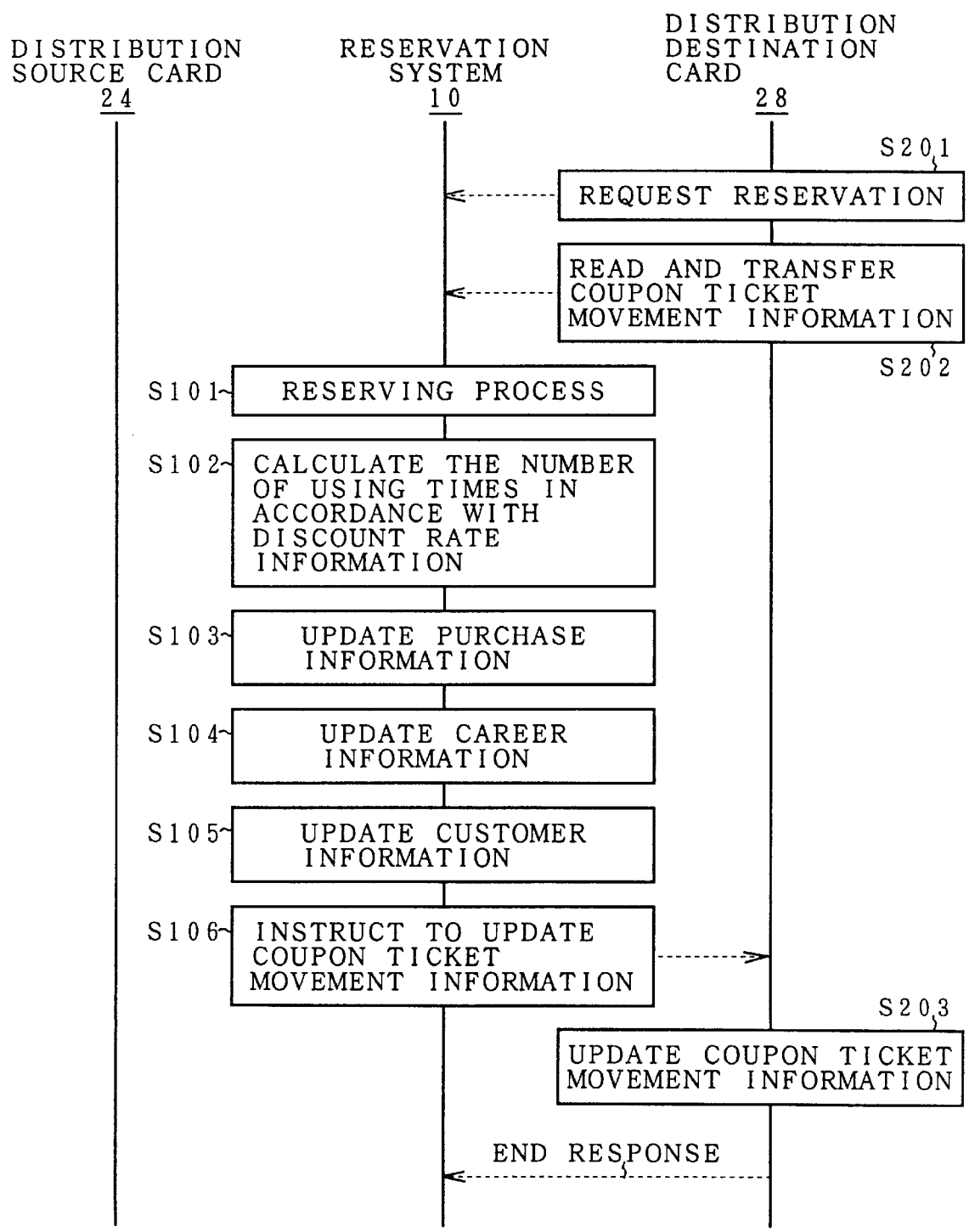
FIG. 21 is a time chart for a reserving process accompanying with the discount in accordance with the number of using times using the distribution destination card.

FIG. 21 shows another embodiment of a reserving process by the distribution destination card 28 which received the movement of the coupon ticket. The embodiment is characterized in that in a manner similar to the embodiment of the reservation by the distribution source card 24 in FIG. 17, the number of using times is calculated by using the discount rate obtained from the discount rate information file 63 in FIG. 9 in accordance with the attribute of the coupon ticket movement information in step S102, and on the basis of the calculated number of using times, the values of the number of using times 96 and the number of remaining using times 100 in the career information file 58 in FIG. 5 are updated in step S104. The other processes are substantially the same as those in FIG. 20.

Figure 22:
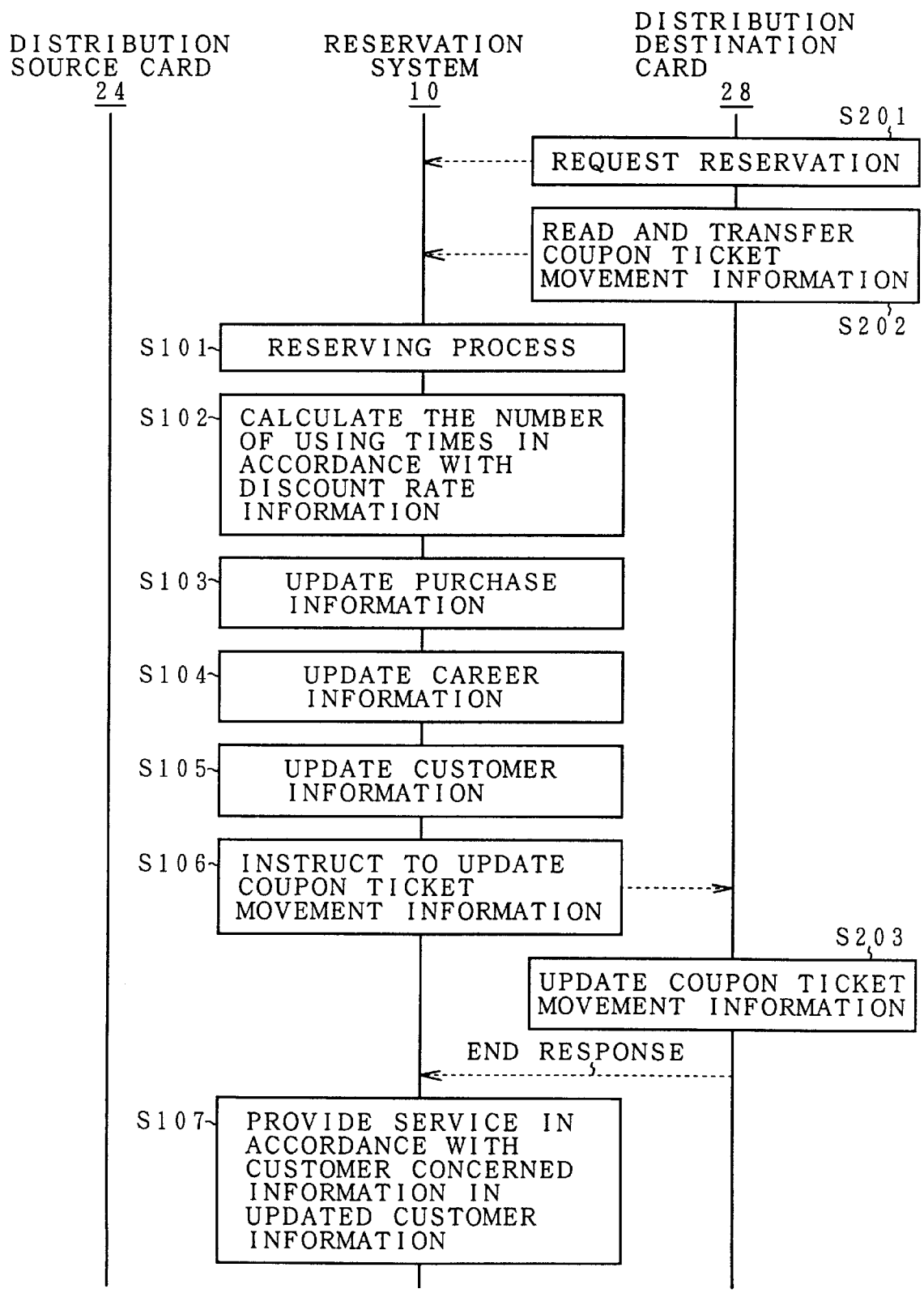
FIG. 22 is a time chart for a reserving process accompanying with a customer service using the distribution destination card.

FIG. 22 shows another procedure of a reserving process using the distribution destination card 28 which received the movement of the coupon ticket and is characterized in that in a manner similar to the embodiment of FIG. 18 showing the reservation by the distribution source card 24, after the end of the reservation, a predetermined service is provided in accordance with the concerned customer information in the updated customer information in step S107 of the reservation system 10. Namely, at the end of the reservation using the distribution destination card 28, from the concerned customer ID in the customer information file 60 in FIG. 6, it will be found that the user of the customer ID=B using the distribution destination card 28 is not the purchaser himself of the coupon ticket, so that he is not the inherent customer. Therefore, an arbitrary premium service is provided to the user using the distribution destination card 28, thereby persuading the user to become a purchaser of the coupon ticket. With this method, it is possible to execute an activity for making the user of the distribution destination card 28 become an inherent customer of the system who purchases the coupon ticket. As a service to the user of the distribution destination card 28, at the time of a check-in at an airport counter using the distribution destination card 28, a passage at a boarding gate, a confirmation of the boarding in the airplane, or the like, a message indicating that the passenger is the user having the distribution destination card 28 which received the movement of the coupon ticket or the like is informed to a counter staff, a gate staff, and a steward on the reservation system 10 side. For example, a flight crew gives a greeting or the like to the user of the distribution destination card 28 while expressing thanks for the use of the coupon ticket. With this method, an effective activity for making the owner of the distribution destination card 28 become the customer of the system as an inherent coupon ticket purchaser can be executed.

Figure 23:
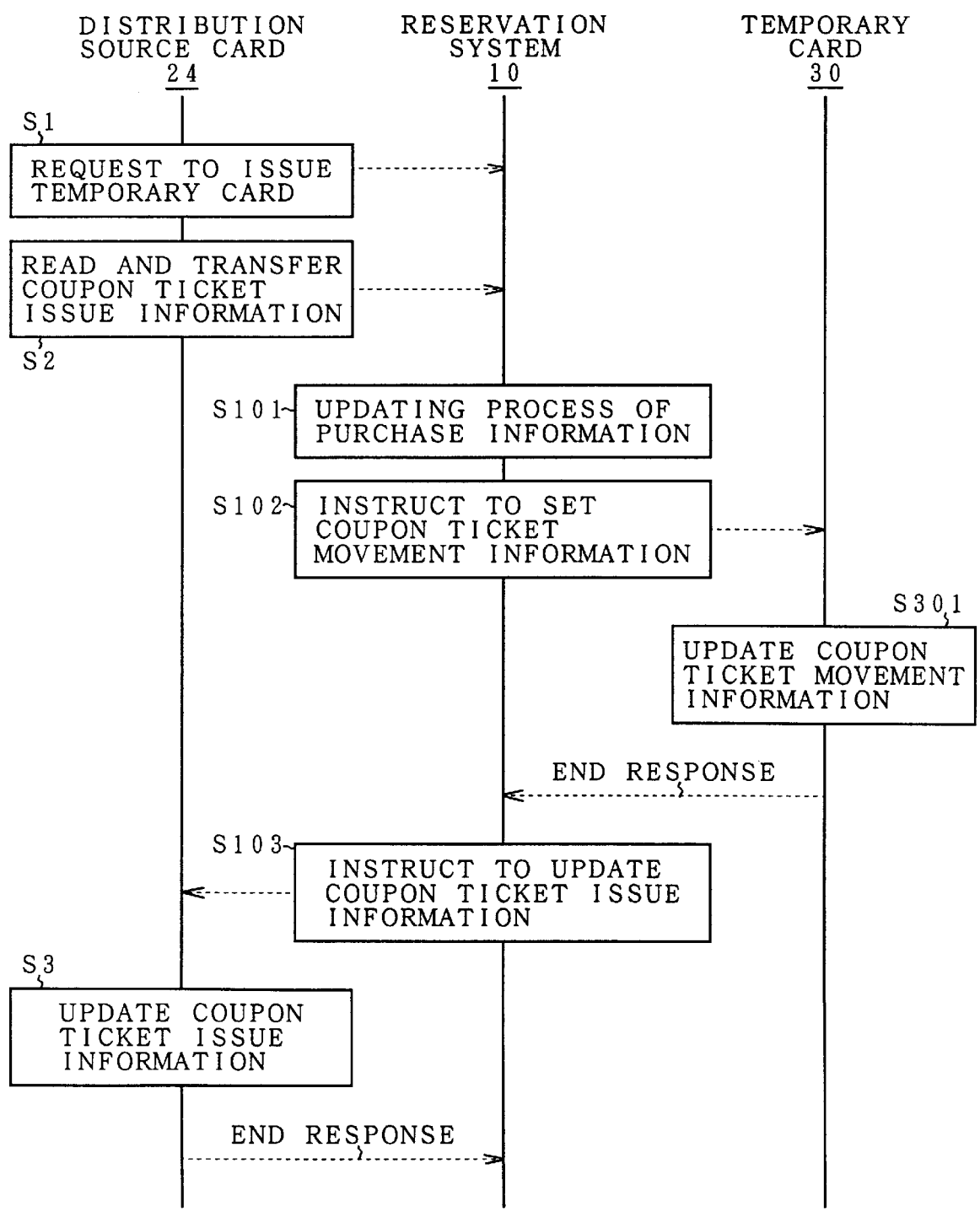
FIG. 23 is a time chart for a coupon ticket moving process for the temporary card.

FIG. 23 is a flowchart for a procedure to issue a temporary card in the system of the invention. First, the distribution source card 24 is set into the counter terminal apparatus or automatic ticket issuing machine in the system. In step S1, a request to issue the temporary card and a reading transfer of the coupon ticket issue information are executed to the reservation system 10. When the issue of the temporary card is requested, a collation by the identification code can be also obviously performed. The reservation system 10 which received the issuing request of the temporary card and the transfer of the coupon ticket issue information executes an updating process regarding "temporary distribution" with regard to the processing division 74 in the purchase information file 56 in FIG. 4 in step S101. That is, "temporary distribution" is recorded in the processing division 74, the number of using times designated by the issuing request is recorded into the number of times of distribution 82, and further, issue year/month/day of the temporary card are recorded into the processing year/month/day 84, and the number of issuing temporary cards 90 is increased by 1. In this instance, since the temporary card 30 is not registered in the system, the reservation system 10 inputs the name 104, address 106, and telephone number 108 which are necessary for the recording of the customer information file 60 in FIG. 6 to the user who receives the issue of the temporary card 30. Subsequently, the reservation system 10 sets coupon ticket movement information for the temporary card 30 as a target with respect to the coupon ticket movement information file 62 in FIG. 8 in step S102. In this case, since the card is the temporary card, "temporary" is recorded in the attribute 138. An instruction is made so as to form the coupon ticket movement information as shown in FIG. 12 based on the recording contents in the coupon ticket movement information file 62 in FIG. 8 and to set it into the temporary card 30 side. In response to the instruction, on the temporary card 30 side, a setting process for recording the coupon ticket movement information 68 having the contents in FIG. 12 onto the temporary card 30 is executed in step S301. After completion of the setting of the coupon ticket movement information in the temporary card 30, the reservation system 10 instructs to update the coupon ticket issue information in step S103. In this instance, in the reservation system 10, the number of times of distribution 124 in the coupon ticket issue information file 61 in FIG. 7 is increased by 1. The ID code indicative of the owner of the temporary card 30 is recorded to the distribution destination 126. The updating instruction of the coupon ticket issue information in step S103 becomes an instruction to increase the value of the number of times of distribution 170 in the coupon ticket issue information 64 recorded on the distribution source card 24 in FIG. 10 by 1. In response to the updating instruction, on the distribution source card 24 side, in step S3, an updating process to increase the value of the number of times of distribution 170 of the distribution source card 24 by 1 is executed in step S3. When the temporary card 30 is issued in FIG. 23, on the system, since the user is not registered and it is necessary to return the temporary card 30 at the end of the use, it is desirable to keep a deposit when the temporary card 30 is issued.

Figure 24:
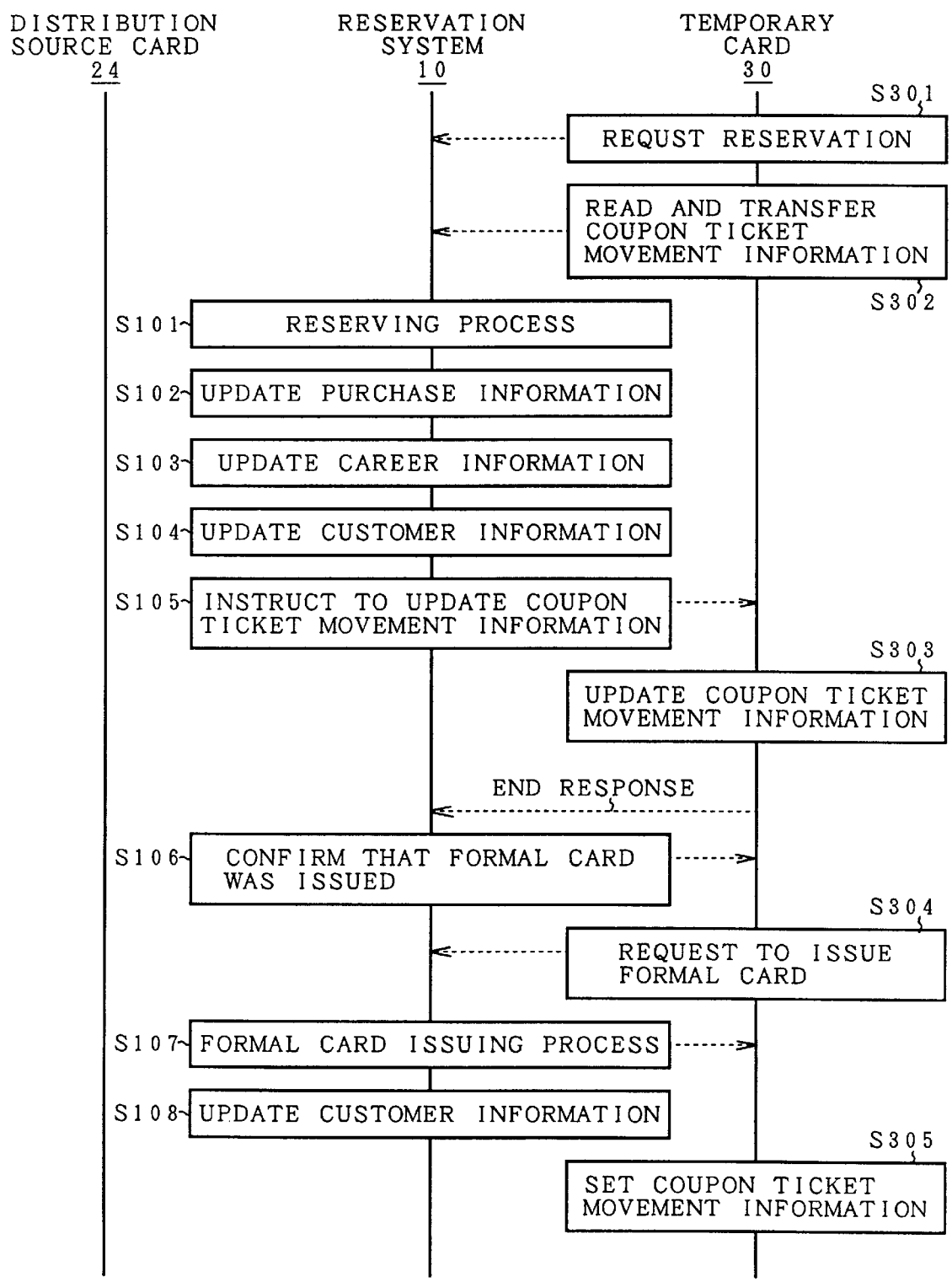
FIG. 24 is a time chart for a reserving process using the temporary card.

FIG. 24 is a time chart showing a procedure for a reserving process using the temporary card 30 issued in FIG. 23. First, a reservation request in step S301 and the reading transfer of the coupon ticket movement information in step S302 in the temporary card 30 are substantially the same as those in case of the reservation using the distribution destination card 28 in FIG. 20. Processes in steps S101 to S105 on the reservation system 10 side in association with those processes are also similar to the processes in case of the distribution destination card 28 in FIG. 20. The updating of the coupon ticket movement information in step S303 is also similar to that in FIG. 20 except only a different point that the card used for the reservation is either the distribution destination card 28 or the temporary card 30. According to the reserving procedure using the temporary card 30 as mentioned above, after completion of the series of processes in association with the reservation in steps S101 to S105 in the reservation system 10, in step S106, a confirmation about the issue of a formal card is executed to the temporary card 30 side. In response to the confirmation of the issue of the formal card, on the temporary card 30 side, when the issue of the formal card is requested as shown in step S304, the reservation system 10 executes a process to issue the formal card in step S107. In the process to issue the formal card, since the information necessary for a registration has already been obtained at the time of the issue of the temporary card in FIG. 23, a registration ID code on the reservation system 10 is newly allocated on the basis of the request to issue the formal card and is recorded to the temporary card 30. By receiving the allocation and registration of the ID code registered on the system, the temporary card 30 functions as a formal registration card, namely, the distribution destination card 28. Subsequently, in step S108, the card kind 116 in the customer information file 60 in FIG. 6 is updated from "temporary use" to "registration". On the temporary card 30 side which received the instruction of the formal card issuing process in step S107 of the reservation system 10, in step S305, the attribute 236 in the coupon ticket movement information 68 shown with respect to the temporary card 30 in FIG. 12 is set from "temporary" to "registration", thereby enabling the temporary card 30 to be used as a formal card.

Processing functions of the coupon ticket issuing module 50, coupon ticket moving module 52, temporary card issuing module 54, and further, use processing module 48 provided for the reservation system 10 of the invention in FIG. 3 will now be described with reference to flowcharts, respectively.

Figure 25:
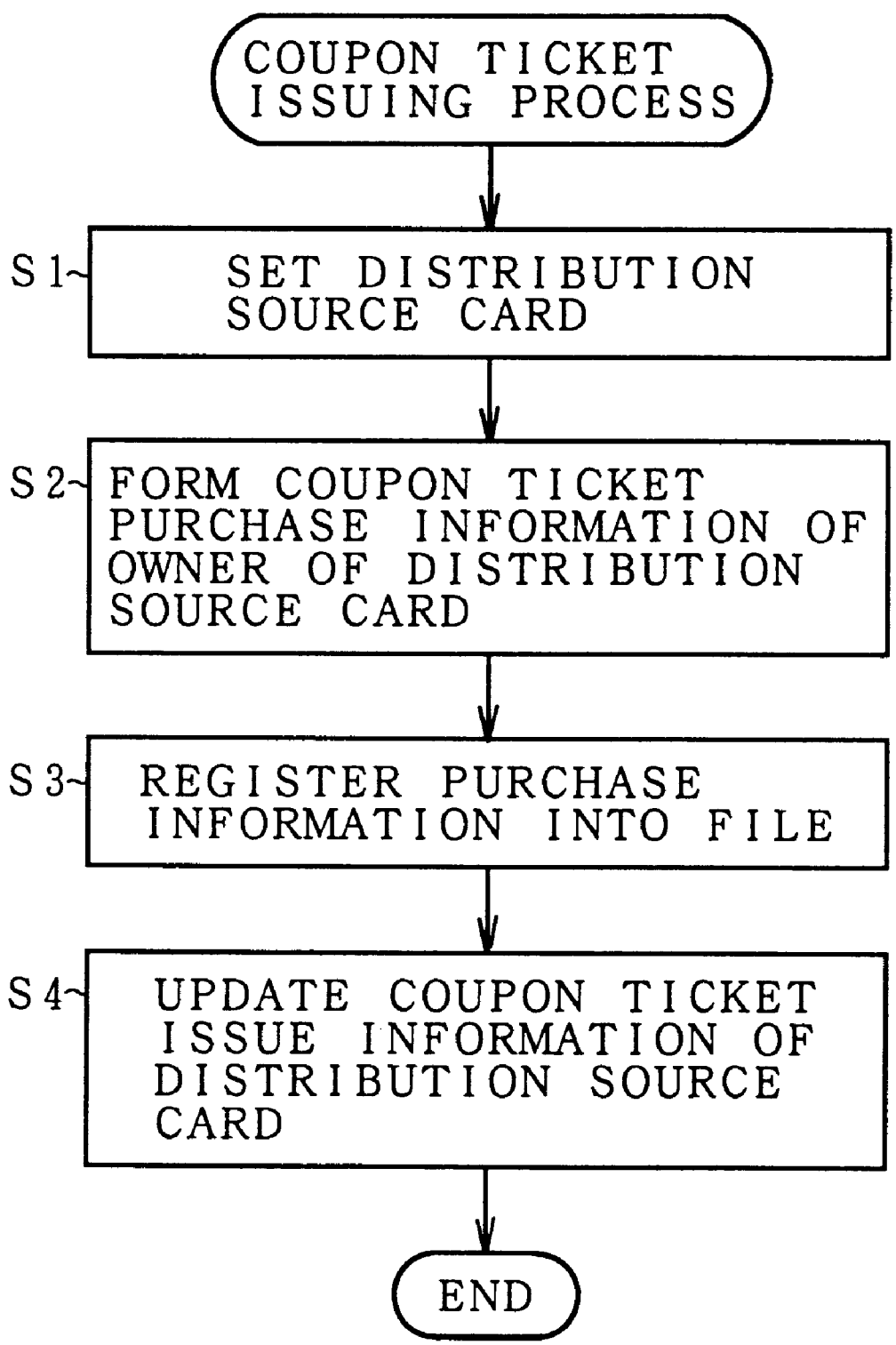
FIG. 25 is a flowchart for a coupon ticket issuing process according to the invention.

FIG. 25 shows the coupon ticket issuing process by the coupon ticket issuing module 50 in FIG. 3. First in step S1, the distribution source card 24 is set into, for example, the counter terminal apparatus or automatic ticket issuing machine of the reservation system 10. In step S2, the coupon ticket purchase information of the owner of the distribution source card 24 is formed on the basis of the coupon ticket issuing request by the card owner. Subsequently, in step S3, the purchase information file 56 is registered. In step S4, the coupon ticket issue information of the distribution source card is updated in step S4. The series of coupon ticket issuing processes are finished.

Figure 26:
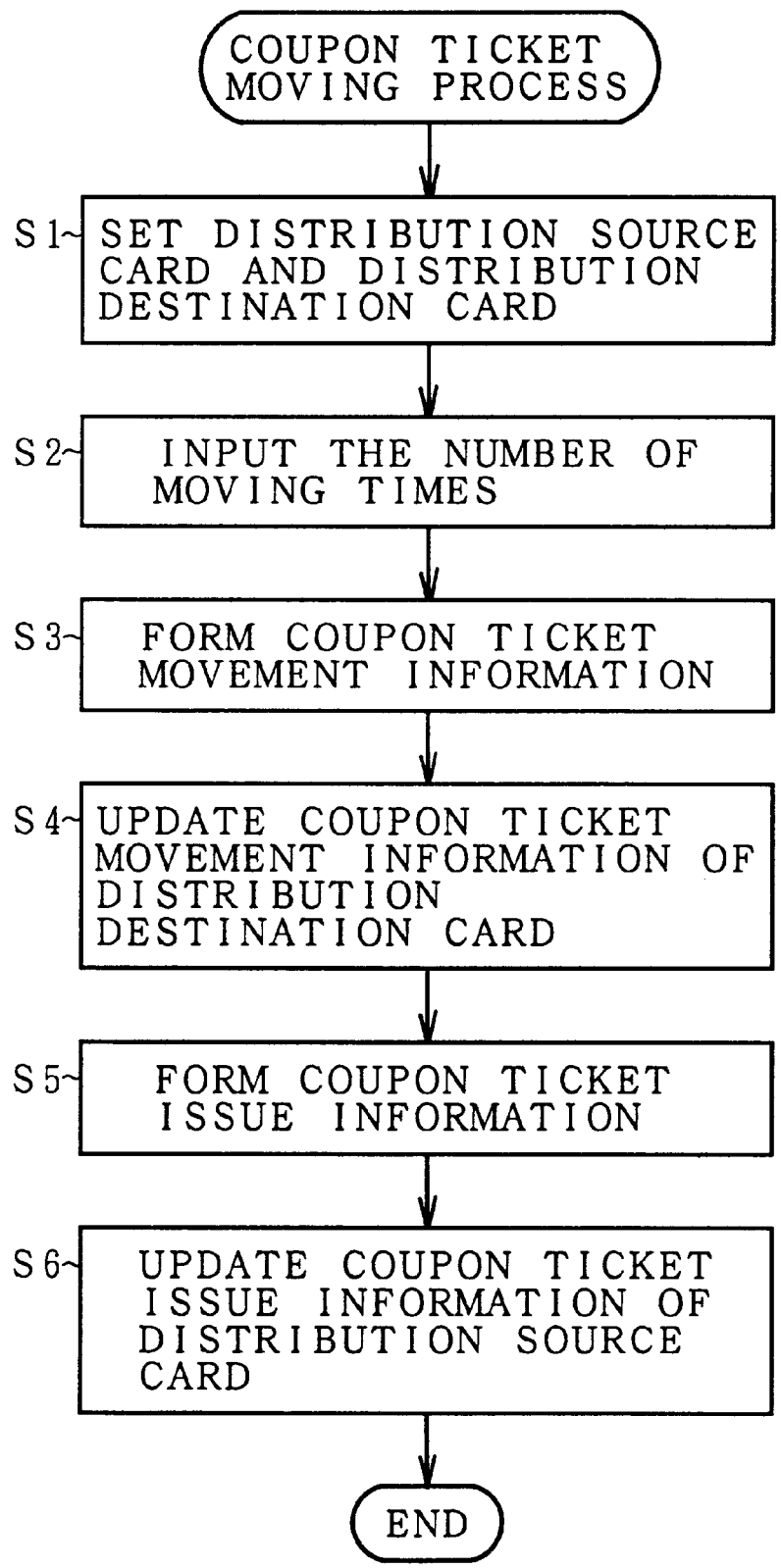
FIG. 26 is a flowchart for a coupon ticket moving process according to the invention.

FIG. 26 is a flowchart for the coupon ticket moving process by the coupon ticket moving module 52 provided for the reservation system 10 in FIG. 3. First in step S1, for instance, since the automatic ticket issuing machine 22 of the reservation system 10 has two IC card ejecting/inserting slots 248 and 250, the distribution source card 24 and distribution destination card 28 are simultaneously set. Subsequently, in step S2, the number of coupon tickets to be moved is inputted and the movement is requested. In this instance, with regard to the distribution source card 24 and distribution destination card 28, a confirmation about the legal use can be also performed by inputting a predetermined identification code. In step S3, the coupon ticket movement information is formed. In step S4, the coupon ticket movement information 66 of the distribution destination card 28 is updated. Further in step S5, the coupon ticket issue information is formed. In step S6, the coupon ticket issue information of the distribution source card 24 is updated. The series of coupon ticket moving processes are finished.

Figure 27:
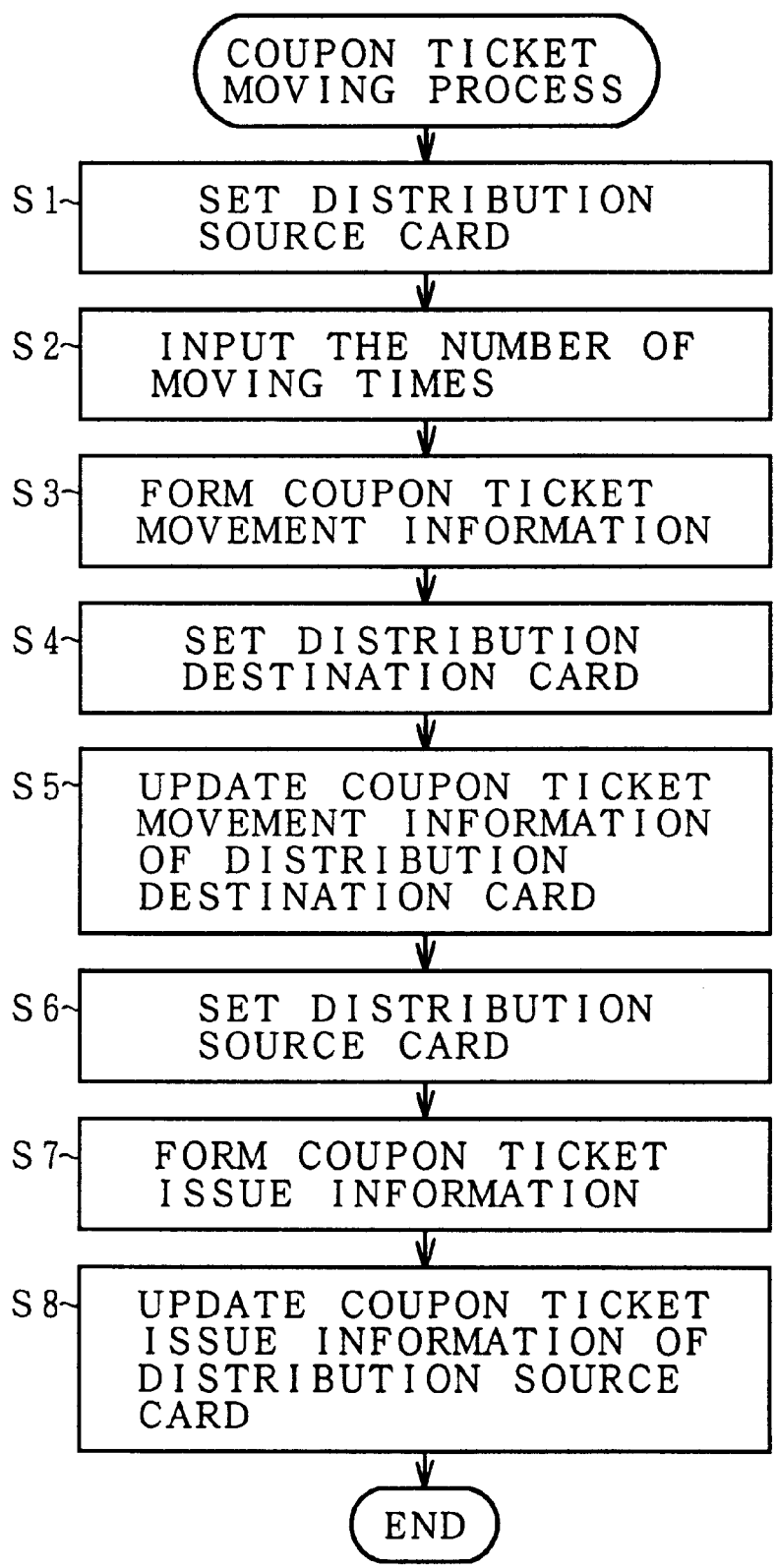
FIG. 27 is a flowchart for another coupon ticket moving process according to the invention.

FIG. 27 is a flowchart for another embodiment of the coupon ticket moving process and relates to a process in the case where both of the distribution source card 24 and distribution destination card 28 of the coupon ticket cannot be simultaneously set and is characterized in that the distribution source card 24 and distribution destination card 28 are sequentially set and the coupon ticket moving process is executed. As for the coupon ticket moving process, for instance, in the coupon ticket moving module 244 of the portable terminal apparatus 26 in FIG. 13, since only one reader/writer of the IC card is ordinarily provided, the coupon ticket moving process according to the flowchart of FIG. 27 is necessary. With respect to the automatic ticket issuing machine 22 in FIG. 14 as well, when there is only one IC card ejecting/inserting slot, the coupon ticket moving process in FIG. 27 is executed.

In the coupon ticket moving process of FIG. 27, first in step SI, the distribution source card 24 is set. In step S2, a moving request by inputting the number of tickets to be moved is performed. In this instance, a collation by the identification code which has been determined on the system can be also executed with regard to the distribution source card 24. In step S3, coupon ticket movement information is formed. In step S4, the distribution destination card 28 is inserted and set in place of the distribution source card. In step S5, the coupon ticket movement information of the distribution destination card 28 is updated. In step S6, the distribution source card 24 is inserted and set in place of the distribution destination card. In step S7, the coupon ticket issue information is formed. In step S8, the coupon ticket issue information of the distribution source card 24 is updated. The series of coupon ticket moving processes are finished.

Figure 28:
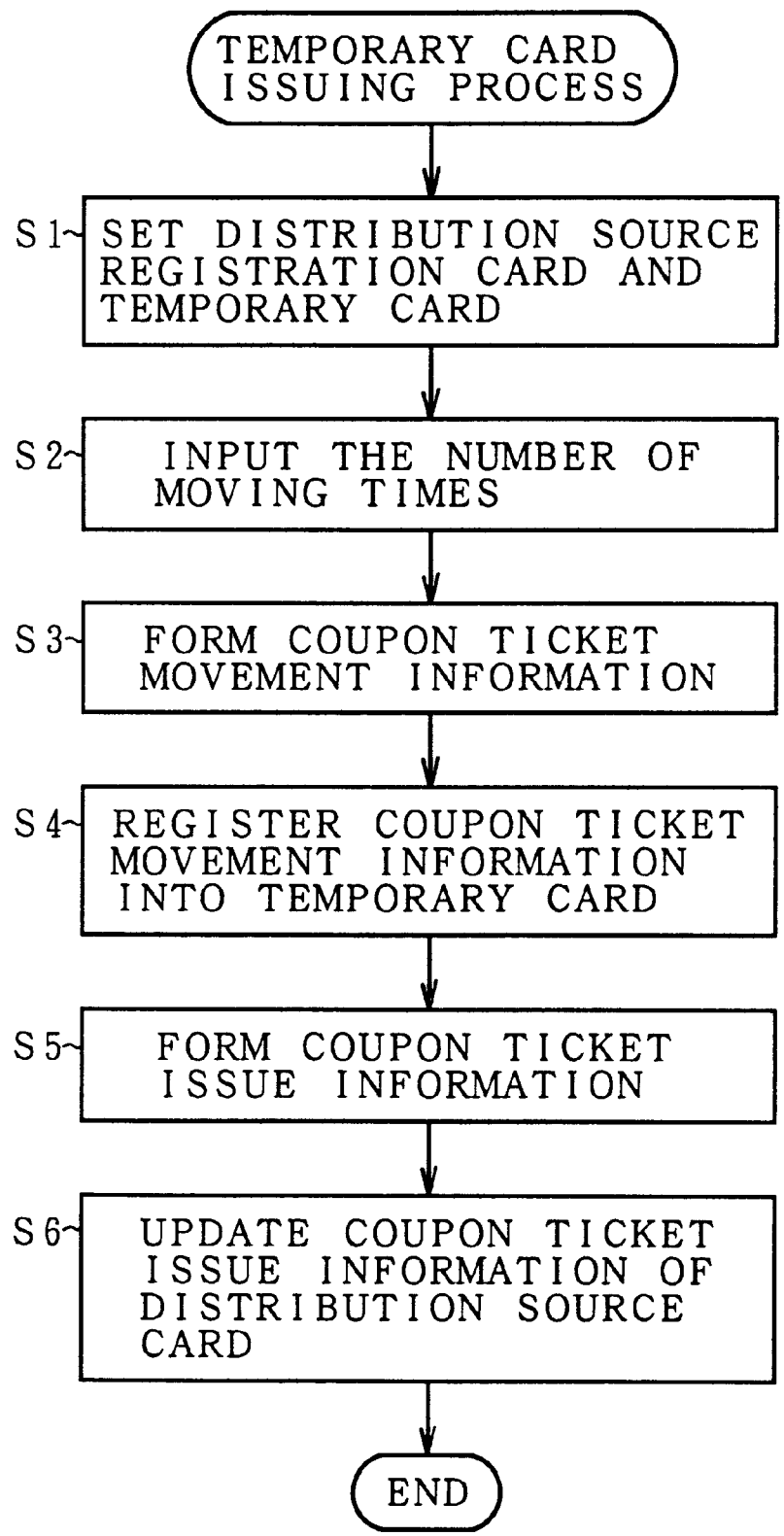
FIG. 28 is a flowchart for a temporary card issuing process according to the invention.

FIG. 28 is a flowchart for an issuing process by the temporary card issuing module 54 in FIG. 3. For simplicity of explanation, the case of using the automatic ticket issuing machine 22 having two IC card ejecting/inserting ports shown in FIG. 14 is shown as an example. First in step SI, the distribution source card 24 and temporary card 30 are set. In step S2, the number of tickets to be moved is inputted and the issue is requested. In step S3, the coupon ticket movement information is formed. In step S4, the coupon ticket movement information is registered into the temporary card 30. In step S5, the coupon ticket issue information is formed. In step S6, the coupon ticket issue information of the distribution source card 24 is updated.

Figure 29:
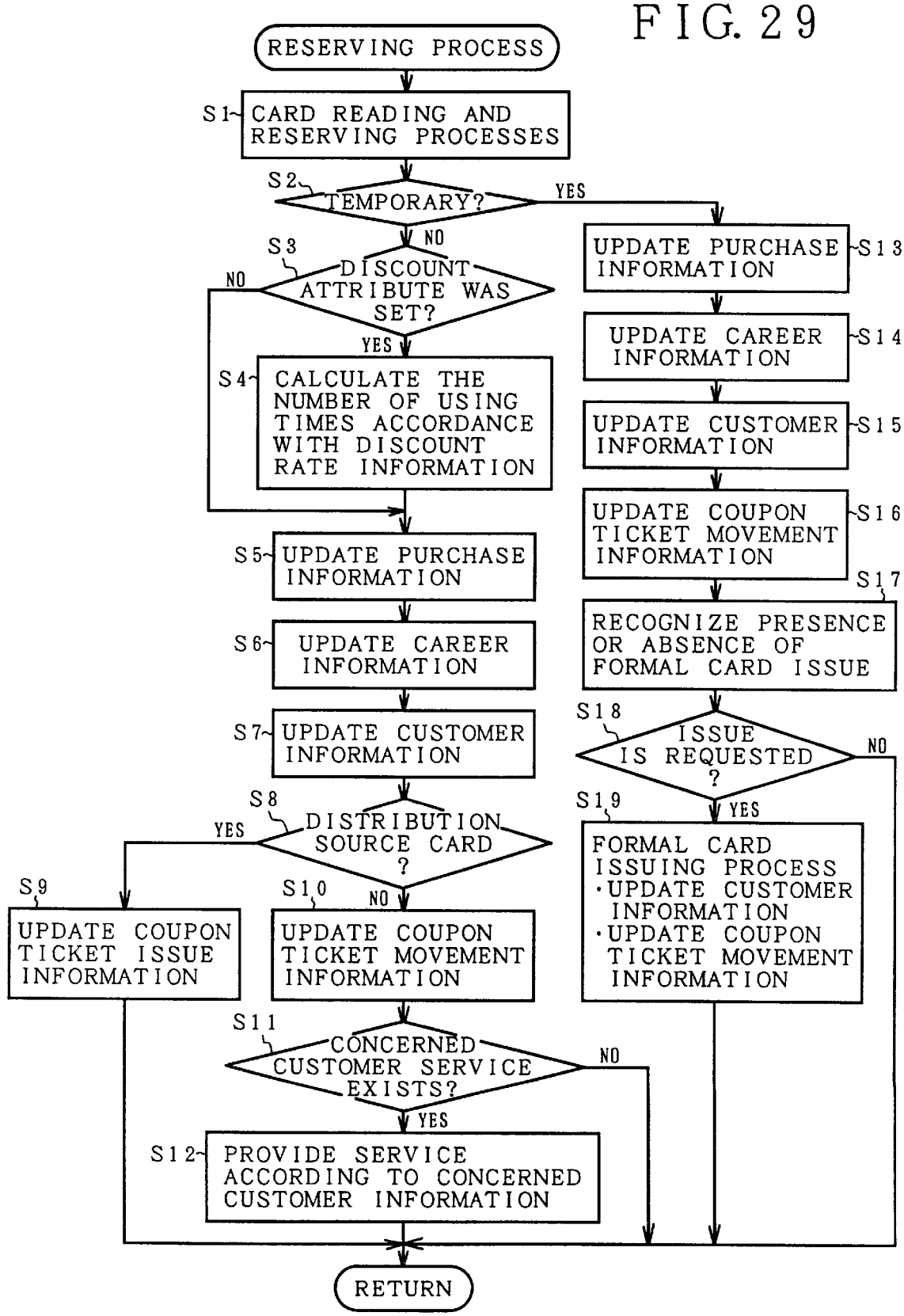
FIG. 29 is a flowchart for the reserving process according to the invention.

FIG. 29 is a flowchart for the use processing module 48 provided for the reservation system 10 in FIG. 3 and relates to a reserving process as an example. First in step S1, a card reading operation and a reserving process by the setting of the distribution source card 24, distribution destination card 28, or temporary card 30. In this instance, a collating process about the legal use is executed by using a predetermined identification code with respect to each card, thereby excluding the illegal use of the card by, for instance, a theft, a lost, or the like. In step S2, a check is made to see if the card is a temporary card. In case of a card other than the temporary card, step S3 follows and a check is made to see if the discount attribute has been set. When the discount attribute has been set, step S4 follows. A discount rate corresponding to the attribute is obtained from the discount information file and the number of using times is calculated. In step S5, the purchase information file is updated. In step S6, the career information file is updated. Further, in step S7, the customer information file is updated. In step S8, a check is made to see if the card is a distribution source card. In case of the distribution source card, step S9 follows and the coupon ticket issue information file and the coupon ticket issue information on the card side are updated. The series of processes are finished. In case of the distribution destination card in step S8, step S10 follows. The coupon ticket movement information file and the coupon ticket movement information on the card side are updated. In step S11, the presence or absence of the concerned customer service is checked. If there is a concerned customer service, a predetermined service according to the concerned customer information of the customer information file is provided in step S12. In this service, a premium service to recommend a purchase of the coupon ticket to the user of the distribution destination card which received the movement of the coupon ticket is performed or a message for allowing a counter staff, a gate staff, a steward, or the like to make a greeting to the user of the distribution source card is notified at the time of a ticket issue, a check-in, or a passage at a boarding gate. On the other hand, when the use card is a temporary card in step S2, the purchase information file is updated in step S13. The career information file is updated in step S14. The customer information file is updated in step S15. After that, the coupon ticket movement information file and the coupon ticket issue information on the card side are updated in step S16. In step S17, the presence or absence of the issue of the formal card is confirmed for the owner of the temporary card. When a request to issue the formal card is obtained in step S8, step S19 follows and the formal card issuing process is executed. Namely, the updating of the customer information file and the updating of the coupon ticket movement information corresponding to the formal card are executed. By the processes in steps S17 to S19, with respect to the user of the transitory temporary card to which a part of the coupon ticket was distributed from the purchaser of the coupon ticket, it is possible to effectively acquire the new customer for changing such a user to the user of the card registered in the system. As means other than FIG. 29, the use of the coupon ticket using the IC card is processed in a ticketless manner by a coupon ticket issue in an airport, an agency, or the like, a check-in at an airport counter, a passage at a boarding gate, a confirmation after boarding, or the like. The necessary information is updated on the system side and on the IC card side.

According to the present invention as mentioned above, in the ticketless system of an airplane or the like, the issue of the coupon ticket using the IC card and the free movement on the user side after the ticket was purchased are enabled, so that the perfect ticketless system using the IC card is realized and a high efficiency of office work processes can be accomplished. Since the movement of the coupon ticket on the card can be freely executed on the user side, a usability of the coupon ticket can be remarkably raised. Further, by using the standardized IC card issued from the bank as an IC card that is used in the ticketless system, even if a service providing enterprise differs, the card can be used. An efficient use of the service providing system using the IC card can be accomplished.

The above embodiment has been shown with respect to the boarding ticket reservation system of the airplane as an example. However, with respect to the use of a proper passenger transportation traffic facility such as train, ship, or the like in which the coupon ticket can be used and, further, the use of a facility such as theater, movie theater, or the like which can be used by the coupon ticket, a ticketless system which enables the issue of the coupon ticket using the IC card and the movement of the coupon ticket to another user can be constructed in substantially the same manner.

What is claimed is:

1. A ticketless system for use in modes of transportation such as an airplane or in a toll facility, using information stored in a distribution source card in which a processor and a memory are installed, said system comprising:

a coupon ticket issuing module to record coupon ticket issue information on the distribution source card to enable plural use of the distribution source card;

a coupon ticket moving module to move a part of the coupon ticket issue information on said distribution source card as coupon ticket movement information to a distribution destination card and enabling the coupon ticket movement information to be used with said distribution destination card; and a use processing module to process a use such as a reservation, a ticket issuance, a check-in, or a boarding on the basis of the coupon ticket issue information of said distribution source card or the coupon ticket movement information of said distribution destination card, wherein each of said distribution source card and said distribution destination card is a registration card which has previously been registered on the ticketless system under a personal name of a user.

2. A ticketless system according to claim 1, further comprising a temporary card issuing module for issuing a temporary card in which a name of a user is not registered on the ticketless system and which is temporarily used, and wherein said coupon ticket moving module moves the coupon ticket movement information onto said temporary card and enables the coupon ticket movement information to be used.

3. A ticketless system according to claim 2, wherein the coupon ticket movement information that is moved to said temporary card includes holder ID information of said distribution source card corresponding to a front cover of a coupon ticket, a use range such as an interval between destinations, the number of times of distribution, the number of uses, personal information such as an age, a card attribute, a purchase year/month/day, and a purchasing location.

4. A ticketless system according to claim 2, wherein when the use by said temporary card is processed, said use processing module confirms a presence or an absence of an issue of a formal registration card registered in the system to the user, and when a request to issue a formal registration card is received from the user, said use processing module issues a formal distribution destination card in which the coupon ticket movement information of said temporary card has been recorded.

5. A ticketless system according to claim 2, wherein said coupon ticket issuing module, said coupon ticket moving module, and said temporary card issuing module are provided in a counter terminal apparatus or in an automatic ticket issuing machine of the ticketless system, thereby executing an issuance of the coupon ticket issue information to said distribution source card, a movement of the coupon ticket movement information from said distribution source card to said distribution destination card, and an issuance of a temporary card to which the coupon ticket movement information was moved from said distribution source card.

6. A ticketless system according to claim 1, wherein the coupon ticket issue information recorded on said distribution source card includes ID information of a card holder corresponding to a front cover of a coupon ticket, a use range such as an interval between destinations, the number of serial coupon tickets, the number of uses, the number of times of distribution, the number of remaining uses, personal information such as an age, a card attribute, a purchase year/month/day, and a purchasing location.

7. A ticketless system according to claim 1, wherein the coupon ticket movement information that is moved to said distribution destination card includes holder ID information of said distribution source card corresponding to a front cover of a coupon ticket, a use range such as an interval between destinations, the number of times of remaining uses, personal information such as an age a card attribute, a purchase year/month/day, and a purchasing location.

8. A ticketless system according to claim 1, further comprising:

a purchase information file to record and manage an issuing situation of a coupon ticket;

a career information file to record and manage a use situation of the coupon ticket issued;

an customer information file to record and manage personal information regarding a user of the coupon ticket issued; and a discount information file to record and manage a discount rate which is used for calculation of a number of uses.

9. A ticketless system according to claim 8, wherein:

the issuing information that said purchase information file records and manages includes a processing division of a purchase, a movement, or a temporary use of the coupon ticket, use contents such as an interval between destinations, a class, number of serial coupon tickets, number of moving times, a movement destination, processing year/month/day, a term of validity, settlement information, and number of issuing tickets of a temporary card;

the use situation that said career information file records and manages includes a use year/month/day, a name of a user, number of uses, and number of remaining uses;

the personal information that said customer information file records and manages includes a customer ID, a name of a user, an address, concerned customer information, a customer kind, and a card; and the discount rate that said discount information file records and manages is predetermined in accordance with an age, or a time zone.

10. A ticketless system according to claim 9, wherein at the time of a reserving process of the coupon ticket based on said distribution source card, said distribution destination card, or said temporary card, said use processing module provides a predetermined service to a holder of said distribution source card with reference to said customer information file.

11. A ticketless system according to claim 10, wherein when a reservation user is a holder of said distribution destination card, said use processing module forms information indicative of a new customer who will newly become a target of a purchase of the coupon ticket and notifies a service providing side of new customer information at the time of the check-in and the boarding.

12. A ticketless system according to claim 10, wherein said use processing module obtains the corresponding discount rate with reference to said discount information file at the time of the reservation, calculates the number of uses by using said discount rate, and updates the number of remaining uses of said career information file.

13. A ticketless system according to claim 1, wherein said use processing module issues a magnetic card or a ticket serving as a use ticket that can be used one time for a reservation using said distribution source card, said distribution destination card, or said temporary card.

14. A ticketless system according to claim 1, wherein said coupon ticket moving module is provided for a portable terminal apparatus of a user, thereby moving the coupon ticket from said distribution source card to said distribution destination card.

15. A ticketless system according to claim 1, wherein said coupon ticket issue information corresponds to a boarding coupon ticket of an airplane.

16. A ticketless processing method for ticketless processing used in modes of transportation such as an airplane or in a toll facility using information stored in a distribution source card in which a processor and a memory are installed, comprising:

previously registering a personal name of a user of the distribution source card into a system;

issuing a coupon ticket and recording coupon ticket issue information on the distribution source card to enable plural use of the destination source card;

recording coupon ticket movement information for moving the coupon ticket of said distribution source card to a distribution destination card and enabling the moved coupon ticket to be used by the distribution destination card; and processing a use such as a reservation, a ticket issuance, a check-in, or a boarding, on the basis of the coupon ticket issue information or coupon ticket movement information of said distribution source card.

17. A ticketless processing method according to claim 16, further comprising issuing a temporary card in which a name of a user is not registered and which is temporarily used, and wherein said recording coupon ticket movement information step records the coupon ticket movement information which moves the coupon ticket of said distribution source card to said temporary card and enables the moved coupon ticket to be used with the temporary card.

18. A memory medium on which a ticketless system processing program for use in modes of transportation such as an airplane or in a toll facility using information stored in a distribution source card in which a processor and a memory are installed has been stored, said memory medium comprising:

a coupon ticket issuing module to record coupon ticket issue information onto the distribution source card to enable plural use of the distribution source card;

a coupon ticket moving module to move a part of the coupon ticket issue information recorded on said distribution source card as coupon ticket movement information onto a distribution destination card and enabling the coupon ticket movement information to be used with said distribution destination card; and a use processing module to process a use such as a reservation, a ticket issuance, a check-in, or a boarding, on the basis of the coupon ticket issue information of said distribution source card or the coupon ticket movement information of said distribution destination card, wherein each of said distribution source card and said distribution destination card is a registration card which has previously been registered on the ticketless system under a personal name of a user.

19. A memory medium according to claim 18, further comprising a temporary card issuing module for issuing a temporary card in which a name of a user is not registered on the system and which is temporarily used, and wherein said coupon ticket moving module moves the coupon ticket movement information onto said temporary card and enables the coupon ticket movement information to be used with said temporary ticket.

20. A ticketless system, comprising:

a coupon ticket issuing module to record coupon ticket issue information onto a first source card to enable the first source card to process use information a plurality of times; and a coupon ticket moving module to move a part of the coupon ticket issue information recorded on the first source card to a second source card to enable the second source card to process use information using the part of the coupon ticket issue information moved from the first source card.

21. A ticketless method of processing airline or toll facility use information, comprising:

issuing a coupon ticket by recording coupon ticket issue information on a first source card to enable the first source card to process the use information a plurality of times; and moving a part of the recorded coupon ticket issue information from the first source card to a second source card to enable the second source card to process use information corresponding to the part of the recorded coupon ticket issue information.

22. A memory medium for causing a computer to record a coupon ticket on a distribution source card, comprising:

issuing a coupon ticket by recording coupon ticket issue information on the distribution source card to enable the distribution source card to process the use information a plurality of times; and moving a part of the recorded coupon ticket issue information from the distribution source card to a distribution destination card to enable the distribution destination card to process use information corresponding to the part of the recorded coupon ticket issue information.

* * * * *